US009383871B2

(12) United States Patent
Adachi

(10) Patent No.: US 9,383,871 B2
(45) Date of Patent: Jul. 5, 2016

(54) DISPLAY DEVICE WITH TOUCH DETECTION FUNCTION AND ELECTRONIC APPARATUS

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/221,873

(22) Filed: Mar. 21, 2014

(65) Prior Publication Data

US 2014/0293159 A1    Oct. 2, 2014

(30) Foreign Application Priority Data

Mar. 29, 2013    (JP) .................... 2013-075088

(51) Int. Cl.
  *G02F 1/1333* (2006.01)
  *G06F 3/044* (2006.01)
  *G06F 3/041* (2006.01)
  *G09G 3/36* (2006.01)

(52) U.S. Cl.
  CPC .............. *G06F 3/044* (2013.01); *G06F 3/0412* (2013.01); *G06F 3/0418* (2013.01); *G09G 3/36* (2013.01)

(58) Field of Classification Search
  USPC ..................... 349/12; 345/173, 174
  See application file for complete search history.

(56) References Cited

U.S. PATENT DOCUMENTS

| | | | |
|---|---|---|---|
| 2010/0182273 A1 | 7/2010 | Noguchi et al. | |
| 2010/0214262 A1* | 8/2010 | Ishizaki et al. | 345/174 |
| 2010/0265210 A1* | 10/2010 | Nakanishi et al. | 345/174 |
| 2010/0328268 A1* | 12/2010 | Teranishi et al. | 345/175 |
| 2012/0062511 A1* | 3/2012 | Ishizaki | G06F 3/044 345/174 |
| 2012/0182258 A1 | 7/2012 | Kubo et al. | |
| 2012/0268418 A1* | 10/2012 | Ishizaki | G06F 3/0412 345/174 |

FOREIGN PATENT DOCUMENTS

| | | |
|---|---|---|
| JP | 11-110115 | 4/1999 |
| JP | 2007-264393 | 10/2007 |
| JP | 2010-197576 | 9/2010 |
| JP | 3167700 | 4/2011 |

(Continued)

OTHER PUBLICATIONS

Office Action issued in connection with Japanese Patent Application No. 2013-075088, dated Aug. 18, 2015. (10 pages).

(Continued)

*Primary Examiner* — Jason Olson
*Assistant Examiner* — Deeprose Subedi
(74) *Attorney, Agent, or Firm* — K&L Gates LLP

(57) ABSTRACT

According to an aspect, a display device with a touch detection function includes: a substrate; a touch detection electrode of a translucent conductor; a dummy electrode of the translucent conductor provided in a region where the touch detection electrode is not provided; and a drive electrode having capacitance with respect to the touch detection electrode. The dummy electrode comprises: a first direction slit dividing the dummy electrode so that pieces of the dummy electrode are adjacent to each other in a second direction; and a plurality of second direction slits each dividing the dummy so that the pieces of the dummy electrode are adjacent to each other in the first direction. The second direction slits include a first linear slit having a first angle and a second linear slit having a second angle different from the first angle.

19 Claims, 23 Drawing Sheets

(56) References Cited

FOREIGN PATENT DOCUMENTS

| | | | |
|---|---|---|---|
| JP | 2011-138154 | | 7/2011 |
| JP | 2011138154 A | * | 7/2011 |
| JP | 2012-226687 | | 11/2012 |
| TW | 201001010 | | 1/2010 |

OTHER PUBLICATIONS

Office Action issued in connection with Taiwan Patent Application No. 103107281, dated Jul. 8, 2015. (14 pages).

Office Action issued in connection with Korean Patent Application No. 10-2014-0034230, dated Aug. 21, 2015. (9 pages).

* cited by examiner

DISPLAY DEVICE WITH TOUCH DETECTION FUNCTION AND ELECTRONIC APPARATUS

CROSS REFERENCES TO RELATED APPLICATIONS

The present application claims priority to Japanese Priority Patent Application JP 2013-075088 filed in the Japan Patent Office on Mar. 29, 2013, the entire content of which is hereby incorporated by reference.

BACKGROUND

1. Technical Field

The present disclosure relates to a display device and an electronic apparatus that can detect an external proximity object, specifically, a display device with a touch detection function and an electronic apparatus that can detect the external proximity object based on a change in capacitance.

2. Description of the Related Art

In recent years, a touch detection device that can detect an external proximity object, what is called a touch panel, has been attracting attention. The touch panel is used for a display device with a touch detection function in a manner mounted on or integrated with a display device such as a liquid crystal display device. In the display device with a touch detection function, various button images and the like are displayed on the display device, so that information can be input using the touch panel instead of a typical mechanical button. The display device with a touch detection function having such a touch panel does not require an input device such as a keyboard, a mouse, and a keypad. Accordingly, use of the display device with a touch detection function tends to expand in portable information devices such as cellular telephones as well as computers.

Examples of type of the touch detection include, but are not limited to, an optical type, a resistance type, a capacitive type, and the like. A capacitive touch detection device is used for portable devices and the like, has a relatively simple structure, and can achieve low power consumption. For example, Japanese Patent Application Laid-open Publication No. 2011-138154 describes a touch panel in which a transparent electrode pattern is made invisible. Japanese Patent Application Laid-open Publication No. 2007-264393 describes a technique to suppress, in a liquid crystal display device including a light-transmissive light condensing sheet, a light and shade pattern (moire) caused by interference between a prism arrangement pitch of the light condensing sheet and a pixel pitch of a liquid crystal display panel.

In the display device with a touch detection function, a pixel of the display panel overlaps with a touch detection electrode. In the touch detection electrode, translucent conductive oxide such as indium tin oxide (ITO) is used as material of the transparent electrode. Although the touch detection electrode is transparent, it has a certain refractive index. Accordingly, in the display device with a touch detection function, a slit (hole pattern) is provided in the transparent electrode pattern of the touch detection electrode so that the touch detection electrode is made invisible with human's eyes.

By arranging a pattern of a dummy electrode having the same light shielding property as that of the touch detection electrode between patterns of the touch detection electrode, it is also possible to reduce possibility that the pattern of the touch detection electrode is visually recognized. The pattern of the dummy electrode not contributing to touch detection should be finely divided by slits so as to make capacity difference with respect to the touch detection electrode.

There may be a difference between a wavelength of light that passes through the transparent electrode pattern of the dummy electrode from the pixel of the display panel and reaches a person, and a wavelength of light that passes through the slit (hole pattern) from the pixel of the display panel and reaches the person. The difference in the wavelengths of light emerges as a change from color that should be originally displayed, and a fringe (color moire) of a color shift pattern (hereinafter, referred to as a moire fringe) may be visually recognized depending on a viewing angle at which the person views the display panel.

For the foregoing reasons, there is a need for a display device with a touch detection function and an electronic apparatus that can prevent the moire fringe of the display panel caused by the dummy electrode from being visually recognized.

SUMMARY

According to an aspect, a display device with a touch detection function includes: a substrate; a display region in which pixels each including a plurality of color regions are arranged in a matrix in a plane parallel to a surface of the substrate; a touch detection electrode of a translucent conductor extending in a first direction in a plane parallel to the surface of the substrate; a dummy electrode of the translucent conductor provided in a region where the touch detection electrode is not provided when viewed from a direction orthogonal to the surface of the substrate; a drive electrode having capacitance with respect to the touch detection electrode; and a display functional layer for displaying an image in the display region. The dummy electrode comprises: a first direction slit that is a region without the translucent conductor, the first direction slit dividing the dummy electrode so that pieces of the dummy electrode are adjacent to each other in a second direction orthogonal to the first direction; and a plurality of second direction slits each of which is a region without the translucent conductor, each second direction slit dividing the dummy so that the pieces of the dummy electrode are adjacent to each other in the first direction. The second direction slits include a first linear slit that is substantially straight and has a first angle with respect to the second direction and a second linear slit that is substantially straight and has a second angle different from the first angle with respect to the second direction.

According to another aspect, an electronic apparatus includes the display device with a touch detection function.

Additional features and advantages are described herein, and will be apparent from the following Detailed Description and the figures.

DETAILED DESCRIPTION

The following describes modes for implementing the present disclosure (embodiments) in detail with reference to drawings. The present disclosure is not limited by content of the embodiments described below. Components described below include a component that is easily conceivable by those skilled in the art and a substantially equivalent component. The components described below may be appropriately combined with each other. The description will be held in the following order.

1. Embodiments (display devices with a touch detection function)
 1-1. First embodiment
 1-2. Second embodiment
 1-3. Other modifications
2. Application examples (electronic apparatuses)
 Examples in which the display device with a touch detection function according to any one of the embodiments and the modifications thereof is applied to an electronic apparatus
3. Aspects of present disclosure

1. Embodiments

Display Device with a Touch Detection Function

Figure 1:
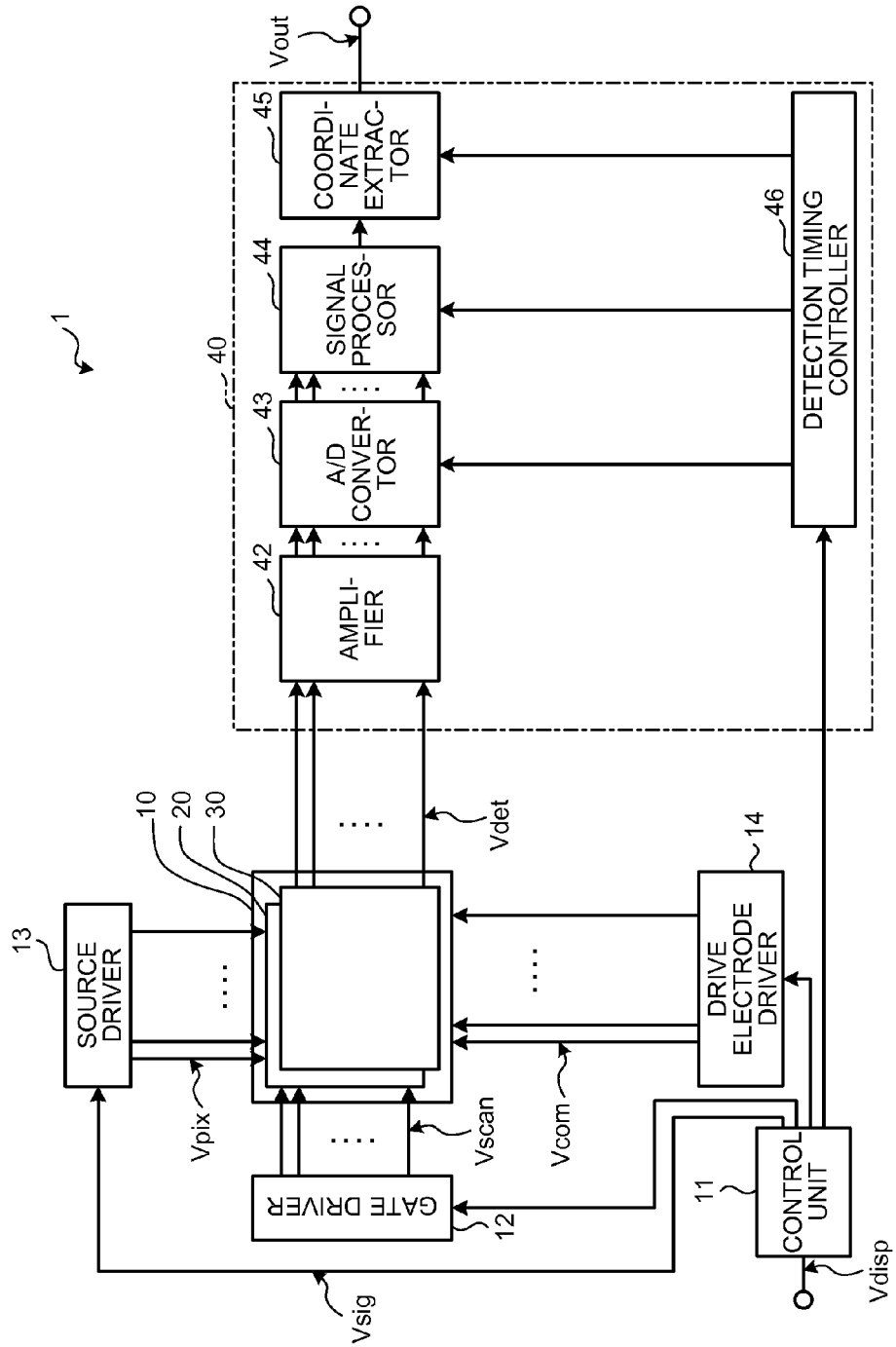
FIG. 1 is a block diagram illustrating a configuration example of a display device with a touch detection function according to a first embodiment.

1-1. First Embodiment
1-1A. Configuration Example
Example of Overall Structure FIG. 1 is a block diagram illustrating a configuration example of a display device with a touch detection function according to a first embodiment. A display device with a touch detection function 1 includes a display unit with a touch detection function 10, a control unit 11, a gate driver 12, a source driver 13, a drive electrode driver 14, and a touch detection unit 40. In the display device with a touch detection function 1, the display unit with a touch detection function 10 incorporates a touch detection function. The display unit with a touch detection function 10 is what is called an in-cell type device in which a liquid crystal display unit 20 including liquid crystal display elements as display elements is integrated with a capacitive touch detection device 30. The display unit with a touch detection function 10 may be what is called an on-cell type device in which the capacitive touch detection device 30 is mounted on the liquid crystal display unit 20 including the liquid crystal display elements as the display elements.

As described later, the liquid crystal display unit 20 is a device that performs display by sequentially scanning for each one horizontal line according to a scanning signal Vscan supplied from the gate driver 12. The control unit 11 is a circuit that supplies a control signal to each of the gate driver 12, the source driver 13, the drive electrode driver 14, and the touch detection unit 40 based on a video signal Vdisp supplied from the outside so that they operate in synchronization with each other.

The gate driver 12 has a function of sequentially selecting one horizontal line serving as a display driving target of the display unit with a touch detection function 10 based on the control signal supplied from the control unit 11.

The source driver 13 is a circuit that supplies a pixel signal Vpix to each pixel Pix (sub-pixel SPix) (described later) of the display unit with a touch detection function 10 based on the control signal supplied from the control unit 11. The source driver 13 generates a pixel signal obtained by time-division multiplexing the pixel signal Vpix of a plurality of sub-pixels SPix of the liquid crystal display unit 20 from the video signal for one horizontal line.

The drive electrode driver 14 is a circuit that supplies a driving signal Vcom to a drive electrode COML (described later) of the display unit with a touch detection function 10 based on the control signal supplied from the control unit 11.

Basic Principle of Capacitive Touch Detection

Figure 2:
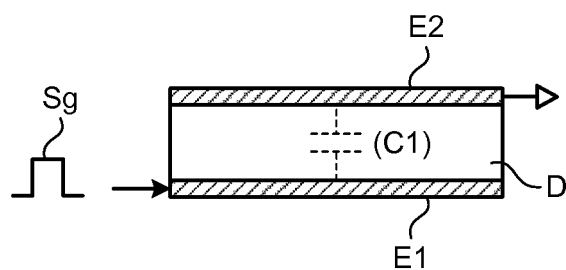
FIG. 2 is an explanatory diagram illustrating a state in which a finger is not in contact with or in proximity to the device, for explaining a basic principle of a capacitive touch detection method.
Figure 3:
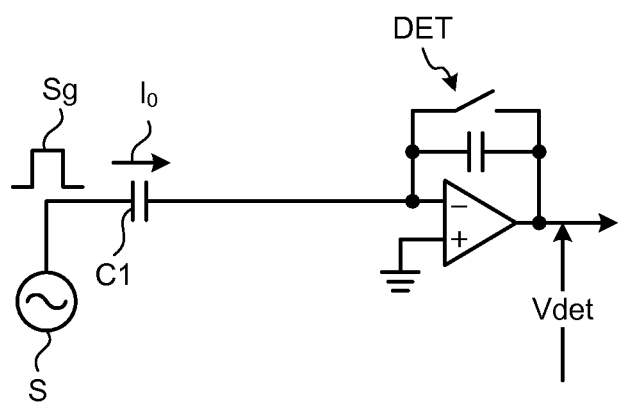
FIG. 3 is an explanatory diagram illustrating an example of an equivalent circuit in the state in which a finger is not in contact with or in proximity to the device as illustrated in FIG. 2.
Figure 4:
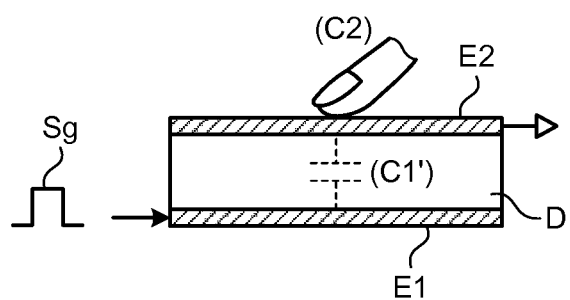
FIG. 4 is an explanatory diagram illustrating a state in which a finger is in contact with or in proximity to the device, for explaining the basic principle of the capacitive touch detection method.
Figure 5:
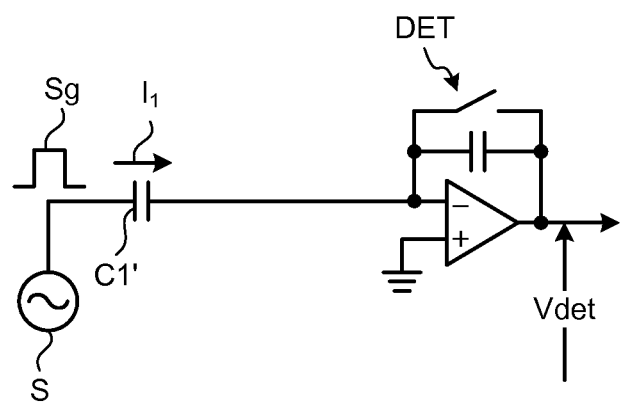
FIG. 5 is an explanatory diagram illustrating an example of the equivalent circuit in the state in which a finger is in contact with or in proximity to the device as illustrated in FIG. 4.
Figure 6:
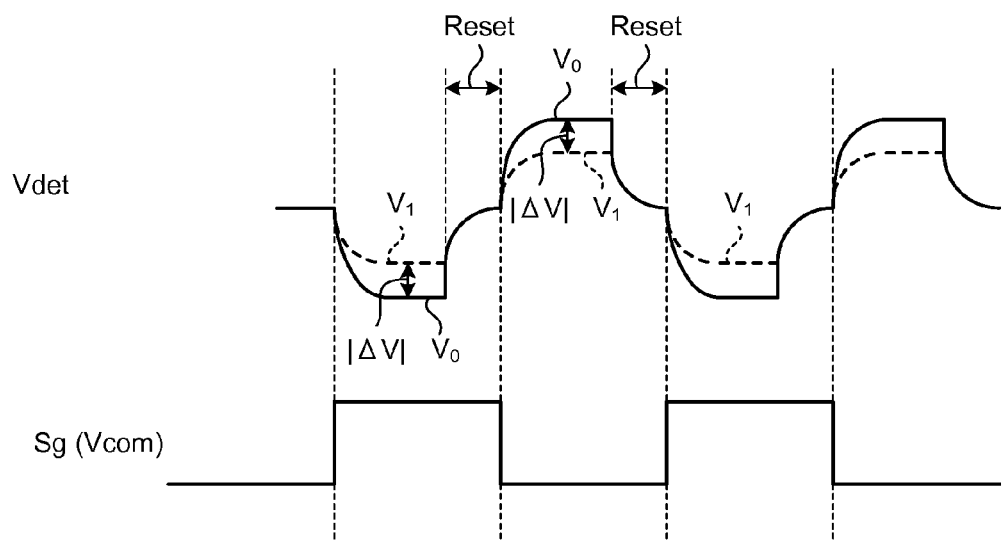
FIG. 6 is a diagram illustrating an example of waveforms of a driving signal and a touch detection signal.

The touch detection device 30 operates based on a basic principle of capacitive touch detection and outputs a touch detection signal Vdet. With reference to FIG. 1 to FIG. 6, the following describes the basic principle of touch detection in the display device with a touch detection function 1 according to the embodiment. FIG. 2 is an explanatory diagram illustrating a state in which a finger is not in contact with or in proximity to the device, for explaining the basic principle of the capacitive touch detection. FIG. 3 is an explanatory diagram illustrating an example of an equivalent circuit in the state in which a finger is not in contact with or in proximity to the device as illustrated in FIG. 2. FIG. 4 is an explanatory diagram illustrating a state in which a finger is in contact with or in proximity to the device, for explaining the basic principle of the capacitive touch detection method. FIG. 5 is an explanatory diagram illustrating an example of the equivalent circuit in the state in which a finger is in contact with or in proximity to the device as illustrated in FIG. 4. FIG. 6 is a diagram illustrating an example of waveforms of the driving signal and the touch detection signal.

For example, as illustrated in FIG. 2, a capacitive element C1 includes a pair of electrodes, that is, a drive electrode E1 and a touch detection electrode E2 that are arranged in a manner opposed to each other sandwiching a dielectric substance D. As illustrated in FIG. 3, the capacitive element C1 is coupled to an alternate current (AC) signal source (driving signal source) S at its one end and coupled to a voltage detector (touch detection unit) DET at its other end. For example, the voltage detector DET is an integrating circuit included in an amplifier (a touch detection signal amplification unit) 42 illustrated in FIG. 1.

When an AC rectangular wave Sg having a predetermined frequency (for example, about several kilohertz to several hundred kilohertz) is applied to the drive electrode E1 (one end of the capacitive element C1) from the AC signal source S, an output waveform (touch detection signal Vdet) appears via the voltage detector DET coupled to the touch detection electrode E2 (the other end of the capacitive element C1). The AC rectangular wave Sg corresponds to a driving signal VcomAC described later.

As illustrated in FIG. 2 and FIG. 3, in the state in which a finger is not in contact with (or in proximity to) the device (non-contact state), an electric current $I_0$ corresponding to a capacitance value of the capacitive element C1 flows according to charge and discharge with respect to the capacitive element C1. The voltage detector DET illustrated in FIG. 5 converts a variation in the electric current $I_0$ corresponding to the AC rectangular wave Sg to a variation in a voltage (waveform $V_0$ illustrated by a solid line).

As illustrated in FIG. 4, in the state in which a finger is in contact with (or in proximity to) the device (contact state), capacitance C2 formed by the finger is in contact with or in proximity to the touch detection electrode E2. Accordingly, capacitance corresponding to a fringe between the drive electrode E1 and the touch detection electrode E2 is blocked and the capacitive element C1 functions as a capacitive element C1' of which capacitance value is smaller. According to an equivalent circuit illustrated in FIG. 5, an electric current $I_1$ flows through the capacitive element C1'. As illustrated in FIG. 6, the voltage detector DET converts a variation in the electric current $I_1$ corresponding to the AC rectangular wave Sg to a variation in the voltage (waveform $V_1$ illustrated by a dotted line). In this case, amplitude of the waveform $V_1$ is smaller than that of the waveform $V_0$ described above. Accordingly, an absolute value $|\Delta V|$ corresponding to a voltage difference between the waveform $V_0$ and the waveform $V_1$ is changed in accordance with influence of an object, such as a finger, approaching from the outside. To accurately detect the absolute value $|\Delta V|$ corresponding to the voltage difference between the waveform $V_0$ and the waveform $V_1$, the voltage detector DET is preferably configured to operate with a period Reset in which charge and discharge of a capacitor are reset corresponding to a frequency of the AC rectangular wave Sg by switching in the circuit.

The touch detection device 30 illustrated in FIG. 1 performs touch detection by sequentially scanning for each detection block according to the driving signal Vcom (driving signal VcomAC described later) supplied from the drive electrode driver 14.

The touch detection device 30 is configured to output the touch detection signal Vdet for each detection block from a plurality of touch detection electrodes TDL (described later) via the voltage detector DET illustrated in FIG. 3 or FIG. 5, and supply the touch detection signal Vdet to an analog-digital (A/D) convertor 43 of the touch detection unit 40.

The A/D convertor 43 is a circuit that samples each analog signal output from the amplifier 42 and converts the analog signal to a digital signal at a timing synchronized with the driving signal VcomAC.

A signal processor 44 includes a digital filter that reduces frequency components (noise components), other than the frequency at which the driving signal Vcom is sampled, included in the output signal from the A/D convertor 43. The signal processor 44 is a logic circuit that detects whether or not the touch detection device 30 is touched based on the output signal from the A/D convertor 43. The signal processor 44 performs processing of taking out only a difference voltage caused by a finger. The difference voltage caused by the finger is the absolute value |ΔV| of a difference between the waveform $V_0$ and the waveform $V_1$ described above. The signal processor 44 may perform an operation of averaging the absolute value |ΔV| per detection block to obtain a mean value of the absolute value |ΔV|. Accordingly, the signal processor 44 can reduce influence by noise. The signal processor 44 compares the detected difference voltage caused by a finger with a predetermined threshold voltage. If the difference voltage is equal to or larger than the threshold voltage, it is determined that an external proximity object approaching from the outside is in the contact state, and if the difference voltage is less than the threshold voltage, it is determined that the external proximity object does is in the non-contact state. In this way, the touch detection unit 40 can perform touch detection.

A coordinate extractor 45 is a logic circuit that obtains touch panel coordinates when touch is detected by the signal processor 44. A detection timing controller 46 controls the A/D convertor 43, the signal processor 44, and the coordinate extractor 45 to be operated in synchronization with one another. The coordinate extractor 45 outputs the touch panel coordinates as a signal output Vout.

Module

Figure 7:
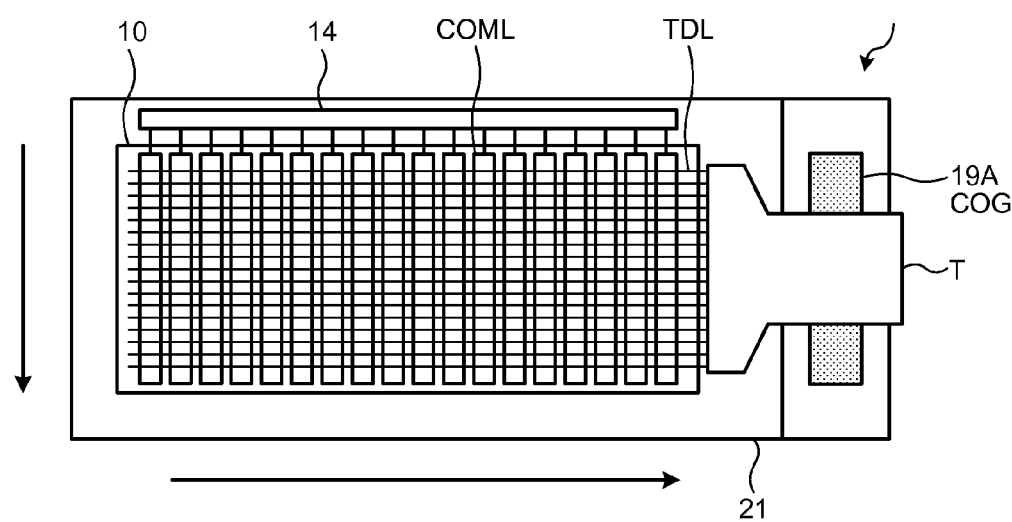
FIG. 7 is a diagram illustrating an example of a module to which the display device with a touch detection function is mounted.
Figure 8:
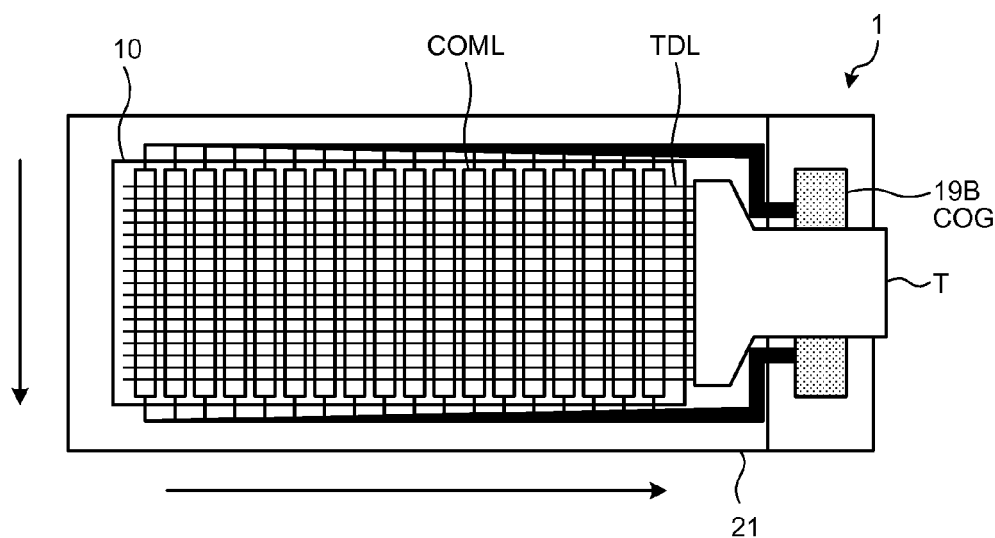
FIG. 8 is a diagram illustrating another example of a module to which the display device with a touch detection function is mounted.

FIG. 7 and FIG. 8 are diagrams illustrating an example of a module to which the display device with a touch detection function is mounted. As illustrated in FIG. 7, when the display device with a touch detection function 1 is mounted to the module, the drive electrode driver 14 may be formed over a TFT substrate 21 (glass substrate).

As illustrated in FIG. 7, the display device with a touch detection function 1 includes the display unit with a touch detection function 10, the drive electrode driver 14, and a chip on glass (COG) 19A. The display unit with a touch detection function 10 schematically illustrates the drive electrodes COML and the touch detection electrodes TDL formed to three-dimensionally intersect the drive electrodes COML in a direction orthogonal to a surface of the TFT substrate 21. That is, the drive electrodes COML are formed to extend in a short side direction of the display unit with a touch detection function 10, and the touch detection electrodes TDL are formed to extend in a long side direction of the display unit with a touch detection function 10. Outputs of the touch detection electrodes TDL are provided at an end portion on the short side of the display unit with a touch detection function 10, and coupled to the touch detection unit 40 mounted to the outside of the module via a terminal part T constituted of a flexible substrate and the like. The drive electrode driver 14 is formed over the TFT substrate 21, which is a glass substrate. The COG 19A is a chip mounted over the TFT substrate 21 and incorporates circuits required for display operation such as the control unit 11, the gate driver 12, and the source driver 13 illustrated in FIG. 1. As illustrated in FIG. 8, in the display device with a touch detection function 1, a chip on glass (COG) 19B may incorporate the drive electrode driver 14.

As illustrated in FIG. 8, the module of the display device with a touch detection function 1 may include the COG 19B. The COG 19B illustrated in FIG. 8 incorporates the drive electrode driver 14 in addition to the circuits required for display operation as described above. As will be described later, the display device with a touch detection function 1 performs line-sequential scanning for each horizontal line in display operation. The display device with a touch detection function 1 sequentially applies the driving signal Vcom to the drive electrode COML in touch detection operation to perform line-sequential scanning for each detection block.

In this way, the display device with a touch detection function 1 illustrated in FIG. 7 and FIG. 8 outputs the touch detection signals Vdet from the short side of the display unit with a touch detection function 10. Accordingly, the number of touch detection electrodes TDL can be reduced in the display device with a touch detection function 1, and routing of wiring is facilitated when the display device with a touch detection function 1 is coupled to the touch detection unit 40 via the terminal part T. In the display device with a touch detection function 1 illustrated in FIG. 8, the COG 19B incorporates the drive electrode driver 14, so that frame portions can be narrowed.

Display Device with Touch Detection Function 10

The following describes a configuration example of the display unit with a touch detection function 10 in detail.

Figure 9:
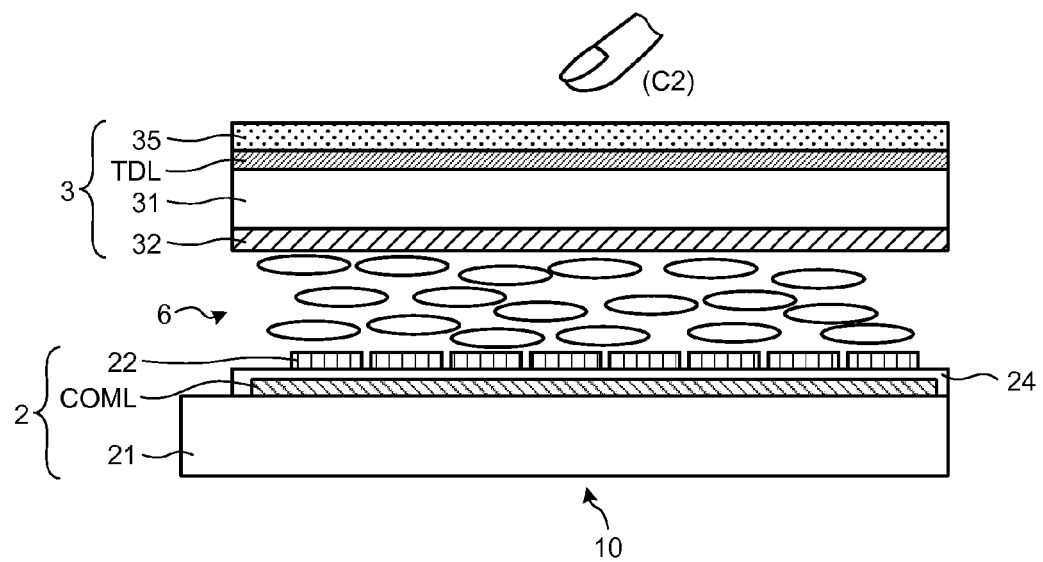
FIG. 9 is a cross-sectional view illustrating a schematic cross-sectional structure of a display unit with a touch detection function according to the first embodiment.
Figure 10:
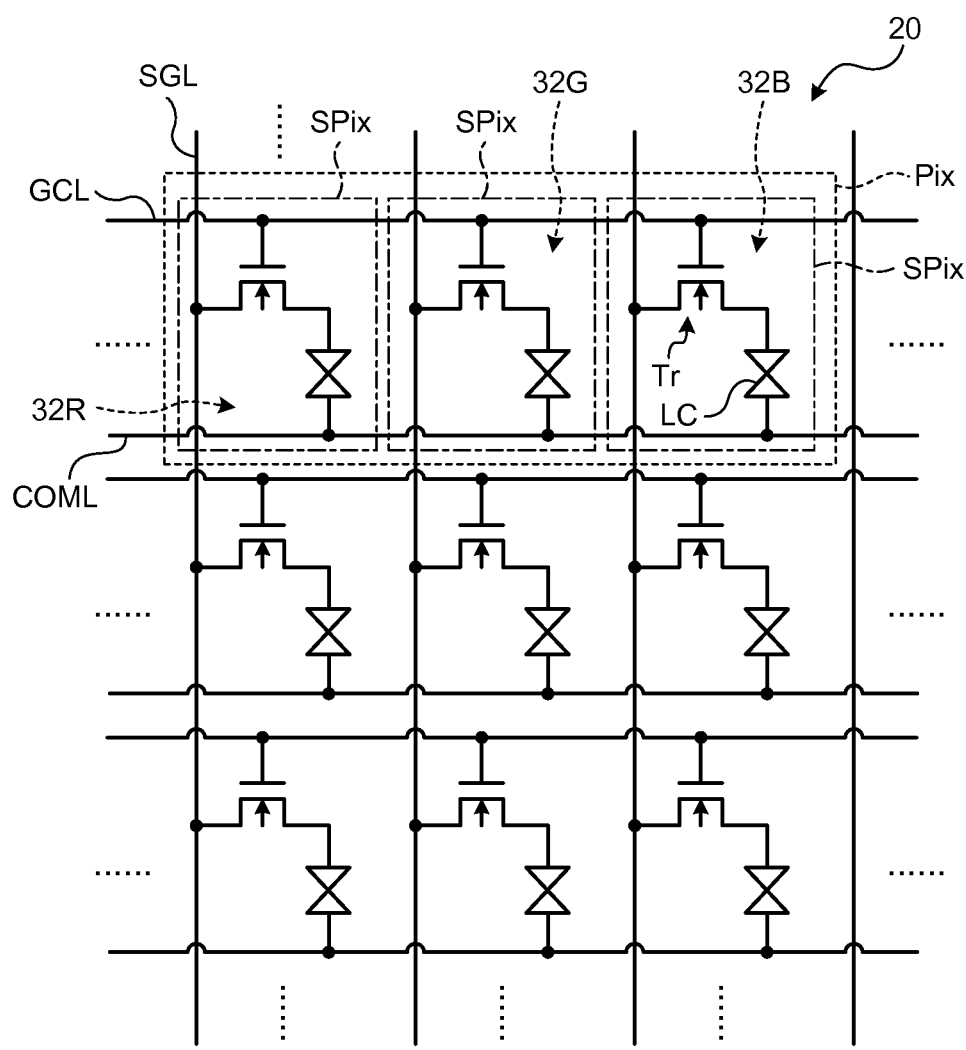
FIG. 10 is a circuit diagram illustrating a pixel array of the display unit with the touch detection function according to the first embodiment.

FIG. 9 is a cross-sectional view illustrating a schematic cross-sectional structure of the display unit with a touch detection function according to the first embodiment. FIG. 10 is a circuit diagram illustrating a pixel array of the display unit with a touch detection function according to the first embodiment. The display unit with a touch detection function 10 includes a pixel substrate 2, a counter substrate 3 arranged in a manner opposed to the pixel substrate 2 in a direction orthogonal to a surface of the pixel substrate 2, and a liquid crystal layer 6 interposed between the pixel substrate 2 and the counter substrate 3.

The pixel substrate 2 includes the TFT substrate 21 serving as a circuit board, a plurality of pixel electrodes 22 arranged in a matrix over the TFT substrate 21, a plurality of drive electrodes COML formed between the TFT substrate 21 and the pixel electrodes 22, and an insulating layer 24 that insulates the pixel electrodes 22 from the drive electrodes COML. Over the TFT substrate 21, formed are thin film transistor (TFT) elements Tr provided respectively to sub-pixels SPix illustrated in FIG. 10, and wiring such as signal lines SGL that supply a pixel signal Vpix to each of the pixel electrodes 22, scanning lines GCL that drives each TFT element Tr, and the like. In this way, the signal lines SGL extend on a plane parallel to the surface of the TFT substrate 21 and supply an image signal for displaying an image to a pixel. The liquid crystal display unit 20 illustrated in FIG. 10 includes a plurality of sub-pixels SPix arranged in a matrix. Each of the sub-pixels SPix includes the TFT element Tr and the liquid crystal element LC. The TFT element Tr is constituted of the thin film transistor. In this example, the TFT element Tr is constituted of an n-channel metal oxide semiconductor (MOS) type TFT. A source of the TFT element Tr is coupled to one of the signal lines SGL, a gate thereof is coupled to one of the scanning lines GCL, and a drain thereof is coupled to one end of the liquid crystal element LC. One end of the liquid crystal element LC is coupled to the drain of the TFT element Tr, and the other end thereof is coupled to one of the drive electrodes COML.

Each of the sub-pixels SPix is coupled to the other sub-pixels SPix belonging to the same row of the liquid crystal display unit 20 by one of the scanning lines GCL. The scanning lines GCL are coupled to the gate driver 12 and supplied with the scanning signal Vscan from the gate driver 12. Each of the sub-pixels SPix is coupled to the other sub-pixels SPix belonging to the same column of the liquid crystal display unit 20 by one of the signal lines SGL. The signal lines SGL are coupled to the source driver 13 and supplied with the pixel signal Vpix from the source driver 13. Each of the sub-pixels SPix is further coupled to the other sub-pixels SPix belonging to the same row of the liquid crystal display unit 20 by one of the drive electrodes COML. The drive electrodes COML are coupled to the drive electrode driver 14 and supplied with the driving signal Vcom from the drive electrode driver 14. That is, in this example, the sub-pixels SPix belonging to the same row share one drive electrode COML.

The gate driver 12 illustrated in FIG. 1 applies the scanning signal Vscan to a gate of the TFT element Tr of the sub-pixels SPix via the scanning lines GCL illustrated in FIG. 10 to sequentially select, as a display driving target, a row (one horizontal line) of the sub-pixels SPix formed in a matrix in the liquid crystal display unit 20. The source driver 13 illustrated in FIG. 1 supplies the pixel signals Vpix to the sub-pixels SPix included in one horizontal line that is sequentially selected by the gate driver 12 via the signal lines SGL illustrated in FIG. 10. In these sub-pixels SPix, one horizontal line is displayed corresponding to the supplied pixel signal Vpix. The drive electrode driver 14 illustrated in FIG. 1 applies the driving signal Vcom to drive the drive electrodes COML in a unit of block including the predetermined number of drive electrodes COML illustrated in FIG. 9 and FIG. 10.

As described above, in the liquid crystal display unit 20, each of the horizontal lines is sequentially selected when the gate driver 12 drives the scanning lines GCL to perform line-sequential scanning in a time division manner. In the liquid crystal display unit 20, the source driver 13 supplies the pixel signals Vpix to the pixels Pix belonging to one horizontal line, so that the horizontal lines are displayed one by one. When the display operation is performed, the drive electrode driver 14 applies the driving signal Vcom to a block including the drive electrode COML corresponding to the horizontal line.

The counter substrate 3 includes a glass substrate 31 and a color filter 32 formed on one surface of the glass substrate 31. The touch detection electrode TDL serving as a detection electrode of the touch detection device 30 is formed on the other surface of the glass substrate 31, and a polarizing plate 35 is formed on the touch detection electrode TDL.

The color filter 32 includes color regions 32R, 32G, and 32B colored in red (R), green (G), and blue (B), respectively. The color filter 32 is opposed to the pixel electrodes 22 in a direction orthogonal to the TFT substrate 21, and overlaps with the pixel electrodes 22 when viewed from a direction orthogonal to the surface of the TFT substrate 21. In the color filter 32, for example, the color filters colored in red (R), green (G), and blue (B) are periodically arranged in a manner associated with the color regions 32R, 32G, and 32B, which are sub-pixels SPix illustrated in FIG. 10, colored in red (R), green (G), and blue (B), and also associated with the pixel Pix as a set. The color filter 32 is opposed to the liquid crystal layer 6 in a direction orthogonal to the TFT substrate 21. The color filter 32 may include other combination of colors as long as they are different colors.

The drive electrode COML according to the embodiment functions as a common electrode (common drive electrode) of the liquid crystal display unit 20, and also as a drive electrode of the touch detection device 30. In the embodiment, each one drive electrode COML is arranged to correspond to one pixel electrode 22 (pixel electrodes 22 included in one row). The insulating layer 24 insulates the pixel electrodes 22 from the drive electrodes COML, and also insulates the pixel electrodes 22 from the signal lines SGL formed over the surface of the TFT substrate 21. The drive electrodes COML are opposed to the pixel electrodes 22 in a direction orthogonal to the surface of the TFT substrate 21, and extend in a direction parallel to a direction in which the scanning lines GCL extend.

The liquid crystal layer 6 modulates light passing therethrough in accordance with a state of an electric field. The liquid crystal layer 6 is driven with a horizontal electric field mode, such as a fringe field switching (FFS) mode or an in-plane switching (IPS) mode, for example.

Orientation film may be arranged between the liquid crystal layer 6 and the pixel substrate 2, and between the liquid crystal layer 6 and the counter substrate 3, respectively. An incident side polarizing plate may be arranged on a lower surface side of the pixel substrate 2.

Figure 11:
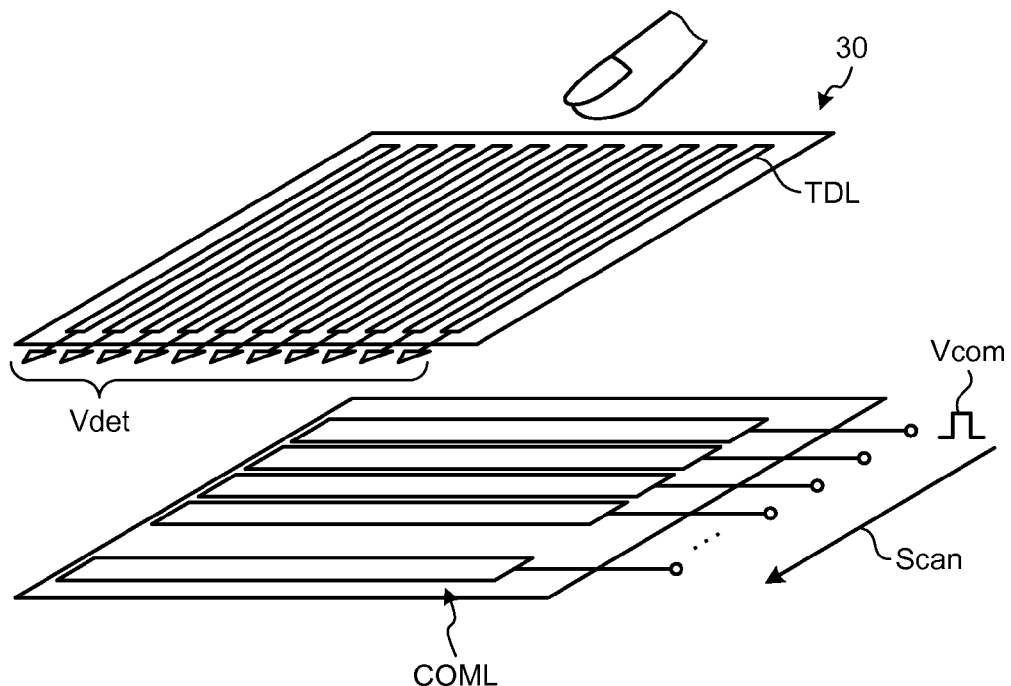
FIG. 11 is a perspective view illustrating a configuration example of drive electrodes and touch detection electrodes of the display unit with a touch detection function according to the first embodiment.

FIG. 11 is a perspective view illustrating a configuration example of the drive electrodes and the touch detection electrodes of the display unit with a touch detection function according to the first embodiment. The touch detection device 30 includes the drive electrodes COML and the touch detection electrodes TDL. The drive electrodes COML have a shape divided into a plurality of stripe-shaped electrode patterns extending in a horizontal direction of the drawing. When touch detection operation is performed, the drive electrode driver 14 sequentially supplies the driving signal Vcom to each of the electrode patterns, and line-sequential scanning drive is performed in a time division manner as will be described later. The touch detection electrodes TDL are configured by stripe-shaped electrode patterns extending in a direction that intersects a direction in which the electrode patterns of the drive electrodes COML extend. The touch detection electrodes TDL are opposed to the drive electrodes COML in a direction orthogonal to the surface of the TFT substrate 21. Each electrode pattern of the touch detection electrodes TDL is coupled to an input of the amplifier 42 of the touch detection unit 40. The electrode patterns of the drive electrodes COML and the touch detection electrodes TDL intersecting each other form capacitance at each intersection thereof.

According to the above configuration, when the touch detection device 30 performs touch detection operation, the drive electrode driver 14 drives the drive electrodes COML as drive electrode blocks to perform line-sequential scanning in a time division manner, thereby sequentially selecting each detection block of the drive electrode COML. In synchronization with that, the touch detection signals Vdet are output from the touch detection electrodes TDL. In this way, touch detection for one detection block is performed. That is, the drive electrode block corresponds to the drive electrode E1 in a basic principle of touch detection described above, and the touch detection electrode TDL corresponds to the touch detection electrode E2. The touch detection device 30 is configured to perform touch detection according to the basic principle. As illustrated in FIG. 11, the electrode patterns intersecting each other form capacitive touch sensors in a matrix. Accordingly, by scanning the entire touch detection surface of the touch detection device 30, it is possible to detect a position where the external proximity object is in contact with or in proximity to the device.

The TFT substrate 21 corresponds to a specific example of the "substrate" in the present disclosure. The pixel electrode 22 corresponds to a specific example of the "pixel electrode" in the present disclosure. The scanning line GCL corresponds to a specific example of the "scanning line" in the present disclosure. The drive electrode COML corresponds to a specific example of the "drive electrode" in the present disclosure. The touch detection electrode TDL corresponds to a specific example of the "touch detection electrode" in the present disclosure. The liquid crystal element LC corresponds to a specific example of a "display functional layer" in the present disclosure. A dummy electrode TDD to be described later corresponds to a specific example of a "dummy electrode" in the present disclosure. The touch detection unit 40 corresponds to a specific example of a "detection processing unit" in the present disclosure. The color filter 32 corresponds to a specific example of "a plurality of color regions" in the present disclosure.

1-1B. Operation and Effect

The following describes an operation and effect of the display device with a touch detection function 1 in the first embodiment.

The drive electrode COML functions as the common drive electrode of the liquid crystal display unit 20 and also as the drive electrode of the touch detection device 30, so that the driving signals Vcom may have influence on each other. Therefore, the driving signal Vcom is applied to the drive electrode COML in a display period B in which display operation is performed and a touch detection period A in which touch detection operation is performed, separately. In the display period B in which display operation is performed, the drive electrode driver 14 applies the driving signal Vcom as a display driving signal. In the touch detection period A in which touch detection operation is performed, the drive electrode driver 14 applies the driving signal Vcom as a touch driving signal. In the description below, the driving signal Vcom serving as the display driving signal may be described as a display driving signal Vcomd, and the driving signal Vcom serving as the touch driving signal may be described as a touch driving signal Vcomt.

Overview of General Operation

The control unit 11 performs control to supply a control signal to each of the gate driver 12, the source driver 13, the drive electrode driver 14, and the touch detection unit 40 based on the video signal Vdisp supplied from the outside so that they operate in synchronization with one another. In the display period B, the gate driver 12 supplies the scanning signal Vscan to the liquid crystal display unit 20 and sequentially selects each horizontal line serving as a display driving target. The source driver 13 supplies a pixel signal Vpix to each pixel Pix included in the horizontal line selected by the gate driver 12 in the display period B.

The drive electrode driver 14 applies the display driving signal Vcomd to the drive electrode block for one horizontal line in the display period B. In the touch detection period A, the drive electrode driver 14 sequentially applies the touch driving signal Vcomt of which frequency is higher than that of the display driving signal Vcomd to the drive electrode block for the touch detection operation, and sequentially selects one detection block. In the display period B, the display unit with a touch detection function 10 performs display operation based on a signal supplied from the gate driver 12, the source driver 13, and the drive electrode driver 14. In the touch detection period A, the display unit with a touch detection function 10 performs touch detection operation based on a signal supplied from the drive electrode driver 14, and outputs the touch detection signals Vdet from the touch detection electrodes TDL. The amplifier 42 amplifies and outputs the touch detection signals Vdet. The A/D convertor 43 converts analog signals output from the amplifier 42 into digital signals at a timing synchronized with the touch driving signal Vcomt. The signal processor 44 detects whether or not the touch detection device 30 is touched based on the output signals from the A/D convertor 43. The coordinate extractor 45 obtains touch panel coordinates when touch is detected by the signal processor 44, and outputs the output signal Vout. The control unit 11 controls the detection timing controller 46 and changes a sampling frequency of the touch driving signal Vcomt.

Detailed Operation

Figure 12:
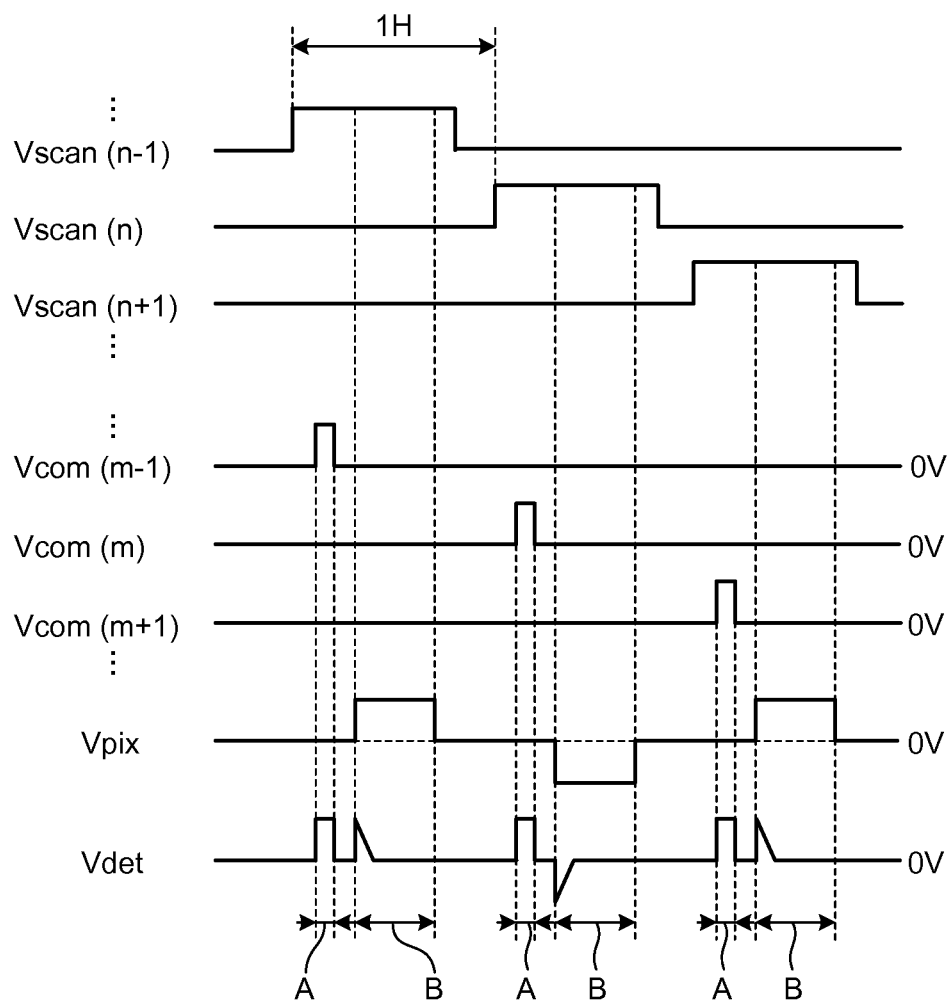
FIG. 12 is a timing waveform chart illustrating an operation example of the display device with a touch detection function according to the first embodiment.

The following describes a detailed operation of the display device with a touch detection function 1. FIG. 12 is a timing waveform chart illustrating an operation example of the display device with a touch detection function according to the first embodiment. As illustrated in FIG. 12, the liquid crystal display unit 20 performs display by sequentially scanning each horizontal line of adjacent (n−1)-th, n-th, and (n+1)-th scanning lines GCL according to the scanning signal Vscan supplied from the gate driver 12. Similarly, the drive electrode driver 14 supplies the signal to adjacent (m−1)-th, m-th, and (m+1)-th drive electrodes COML of the display unit with a touch detection function 10 based on the control signal supplied from the control unit 11.

In this way, the display device with a touch detection function 1 performs touch detection operation (touch detection period A) and display operation (display period B) in a time division manner for each display horizontal period 1H. In the touch detection operation, scanning for touch detection is performed by selecting different drive electrode COML and applying the driving signal Vcom for each display horizontal period 1H. The following describes an operation thereof in detail.

First, the gate driver 12 applies the scanning signal Vscan to the (n−1)-th scanning line GCL, so that the scanning signal Vscan (n−1) is changed from a low level to a high level. Accordingly, one display horizontal period 1H is started.

Then, in the touch detection period A, the drive electrode driver 14 applies the driving signal Vcom to the (m−1)-th drive electrode COML, so that the driving signal Vcom (m−1) is changed from a low level to a high level. The driving signal Vcom (m−1) is transmitted to the touch detection electrodes TDL via respective capacitances, and the touch detection signals Vdet are changed. When the driving signal Vcom (m−1) is changed from a high level to a low level, the touch detection signals Vdet are similarly changed. A waveform of each touch detection signal Vdet in the touch detection period A corresponds to the touch detection signal Vdet in the basic principle of touch detection described above. The A/D convertor 43 A/D converts the touch detection signals Vdet in the touch detection period A so that touch detection is performed. In this way, in the display device with a touch detection function 1, touch detection is performed for one detection block.

Then, in the display period B, the source driver 13 applies the pixel signals Vpix to the signal lines SGL and performs display for one horizontal line. As illustrated in FIG. 12, a change in the pixel signal Vpix may be transmitted to the touch detection electrode TDL via a parasitic capacity and the touch detection signal Vdet may be changed. However, in the display period B, the A/D convertor 43 may be prevented from performing A/D conversion to suppress influence on the touch detection caused by the change in the pixel signal Vpix. After the source driver 13 supplies the pixel signals Vpix, the gate driver 12 changes the scanning signal Vscan (n−1) of the (n−1)-th scanning line GCL from a high level to a low level, and one display horizontal period 1H is ended.

Next, the gate driver 12 applies the scanning signal Vscan to the n-th scanning line GCL different from the above, and the scanning signal Vscan (n) is changed from a low level to a high level. Accordingly, the next display horizontal period 1H is started.

In the next touch detection period A, the drive electrode driver 14 applies the driving signal Vcom to the m-th drive electrode COML different from the above. The A/D convertor 43 A/D converts a change in each touch detection signal Vdet so that touch detection is performed for one detection block.

In the display period B, the source driver 13 applies the pixel signals Vpix to the signal lines SGL and performs display for one horizontal line. Because the display device with a touch detection function 1 in the embodiment performs an inversion drive, a polarity of each pixel signal Vpix applied by the source driver 13 is inverted as compared to that in the previous display horizontal period 1H. After the display period B is ended, the display horizontal period 1H is ended.

Subsequently, the above operations are repeated, so that the display device with a touch detection function 1 performs display operation by scanning over the entire display surface and performs touch detection operation by scanning over the entire touch detection surface.

In one display horizontal period 1H, the display device with a touch detection function 1 performs touch detection operation in the touch detection period A and performs display operation in the display period B. In this way, the touch detection operation and the display operation are performed separately in different periods. Accordingly, the display operation and the touch detection operation can be both performed in the same display horizontal period 1H, and influence on the touch detection caused by the display operation can be suppressed.

Arrangement of Touch Detection Electrodes

Figure 13:
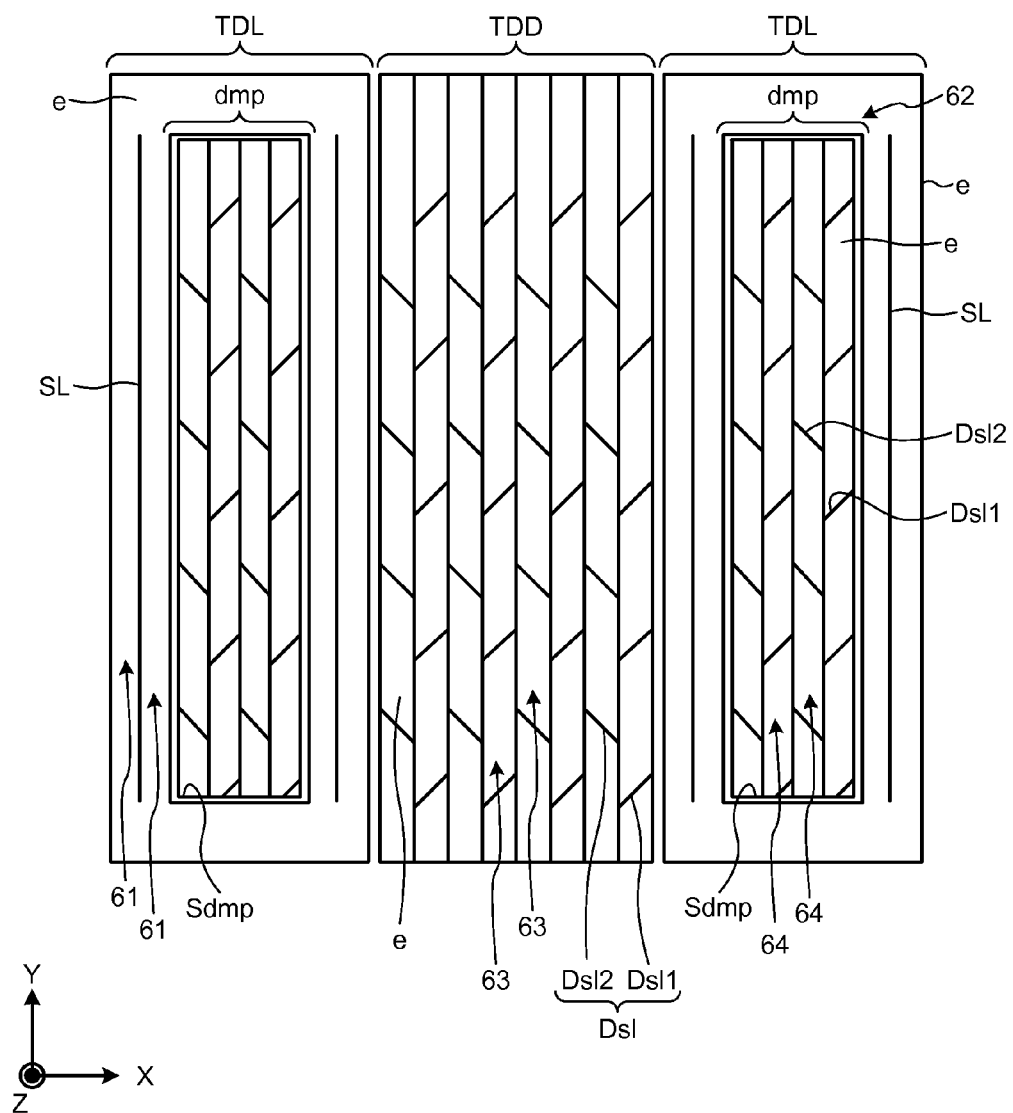
FIG. 13 is a schematic diagram illustrating an arrangement of a dummy electrode according to the first embodiment.

FIG. 13 is a schematic diagram illustrating an arrangement of a dummy electrode according to the first embodiment. The touch detection electrodes TDL illustrated in FIG. 13 extend in a first direction (Y-direction) different from a second direction (X-direction) in which the scanning lines GCL illustrated in FIG. 10 extend. The touch detection electrodes TDL are arranged at a predetermined pitch. A translucent conductive oxide such as indium tin oxide (ITO) is used for material of the transparent electrode of the touch detection electrodes TDL. Although the touch detection electrodes TDL are transparent, they have a predetermined refractive index. Due to this, in the display device with a touch detection function 1, the dummy electrode TDD is arranged between each pair of the transparent electrode patterns of the touch detection electrodes TDL to make the touch detection electrodes TDL invisible to human's eyes.

Accordingly, as illustrated in FIG. 13, the dummy electrode TDD that is not coupled to the touch detection unit 40 is arranged between each pair of the touch detection electrodes TDL in a manner extending in parallel with an extending direction (Y-direction) of the touch detection electrodes TDL in the counter substrate 3. Each dummy electrode TDD is made of material same as that of the touch detection electrodes TDL. Accordingly, visibility of the touch detection electrodes TDL is reduced.

Each touch detection electrode TDL includes detection electrode patterns 61 and detection electrode conducting parts 62 that establish conduction between the detection electrode patterns 61. The detection electrode patterns 61 and the detection electrode conducting parts 62 make a pattern of a translucent conductor e such as ITO surrounding a dummy pattern dmp that is a non-detection region.

Although the detection electrode patterns 61 are transparent, they have a predetermined refractive index. Due to this, in the display device with a touch detection function 1, a slit SL without the translucent conductor e such as ITO is arranged in the detection electrode pattern 61 of the touch detection electrode TDL to make the touch detection electrode TDL invisible to human's eyes.

Similarly, also in the non-detection region surrounded by the detection electrode patterns 61 and the detection electrode conducting parts 62, the dummy pattern dmp is arranged using the translucent conductor e such as ITO to make the touch detection electrode TDL invisible to human's eyes. The dummy pattern dmp is divided into strap-shaped dummy patterns (dummy electrode pieces) 64 by the slit SL described above. The dummy pattern dmp is insulated from the detection electrode patterns 61 and the detection electrode conducting parts 62 by an edge slit pattern Sdmp without the translucent conductor e. The dummy pattern dmp is included in specific examples of the dummy electrode according to the present disclosure.

Each dummy electrode TDD is divided into strap-shaped dummy patterns 63 of the translucent conductor e such as ITO by the slit SL described above. The slit SL also makes a boundary between the dummy electrode TDD and the touch detection electrode TDL. The slit SL between the dummy electrode TDD and the touch detection electrode TDL and the slits SL in the detection electrode pattern 61, the dummy pattern dmp, and the dummy electrode TDD are arranged at equal intervals. The dummy electrode TDD and the dummy pattern dmp include a slit SL (first direction slit) that is a region without the translucent conductor e and that divides the translucent conductor e into a plurality of dummy patterns 63 or 64 so that the dummy patterns 63 or 64 are adjacent to each other in the second direction (X-direction) orthogonal to the first direction (Y-direction), and a second direction slit Dsl that is a region without the translucent conductor e and that divides each of the dummy patterns 63 and 64 into a plurality of dummy electrode pieces so that the dummy electrode pieces are adjacent to each other in the first direction (Y-direction). The pattern of the dummy electrode that does not contribute to touch detection generates a capacity difference with respect to the touch detection electrode, so that the pattern needs to be finely divided by the slits. Accordingly, in the dummy electrode TDD and the dummy pattern dmp, the number of division of the second direction slit Dsl is preferably larger than the number of slits (first direction slits) SL. As described above, the number of second direction slits Dsl of the dummy electrode TDD is different from the number of first direction slits SL of the dummy electrode TDD. Similarly, the number of second direction slits Dsl of the dummy pattern dmp is different from the number of first direction slits SL of the dummy pattern dmp.

The second direction slits Dsl include a first linear slit Dsl1 that is substantially straight and has a first angle with respect to the second direction (X-direction), and a second linear slit Dsl2 that is substantially straight and has a second angle different from the first angle with respect to the second direction (X-direction). The first linear slit Dsl1 and the second linear slit Dsl2 are line-symmetric with respect to the X-direction.

Both ends of the first linear slit Dsl1 are coupled to the adjacent slits SL, respectively. Also, both ends of the second linear slit Dsl2 are coupled to the adjacent slits SL, respectively. The dummy electrode TDD and dummy pattern dmp include a plurality of first linear slits Dsl1, and the first slits Dsl1 are arranged at a certain first pitch in the Y-direction. The dummy electrode TDD and dummy pattern dmp include a plurality of second linear slits Dsl2, and the second linear slits Dsl2 are arranged at a certain second pitch in the Y-direction. When the first pitch and the second pitch are caused to have the same size, and a position of the first linear slit Dsl1 in the Y-direction is caused to be different from a position of the second linear slit Dsl2 in the Y-direction, the first linear slit Dsl1 and the second linear slit Dsl2 do not align with each other in the X-direction.

A wavelength of light that reaches a person passing through the detection electrode pattern 61, the detection electrode conducting part 62, or the dummy pattern 64 of the touch detection electrode TDL or the dummy pattern 63 of the dummy electrode TDD from the pixel Pix of the liquid crystal display unit 20 may be different from a wavelength of light that reaches a person passing through the slit SL from the pixel Pix of the liquid crystal display unit 20 depending on whether or not there is the translucent conductor e. The difference in the wavelengths of light may emerge as a change from color that should be originally displayed, and a moire fringe may be visually recognized depending on a viewing angle at which the person views a display unit with a touch detection function.

As described above, the second direction slits Dsl and the slits SL according to the first embodiment are arranged in such a manner that directions thereof vary in three different directions when viewed from a direction orthogonal to the surface of the TFT substrate 21. Accordingly, in the display device with a touch detection function 1, reduction in the transmittance per unit area is averaged for each pixel Pix and the moire fringe can be hardly recognized.

In the display device with a touch detection function 1 according to the first embodiment, it is possible to suppress the possibility of difference in the wavelengths of light depending on whether or not there is the translucent conductor e. Accordingly, the display device with a touch detection function 1 according to the first embodiment can suppress the possibility that the liquid crystal display unit 20 shifts the color that should be originally displayed. As a result, the display device with a touch detection function 1 according to the first embodiment can reduce the possibility that the moire fringe is visually recognized depending on the viewing angle.

1-1C. First Modification of First Embodiment

Figure 14:
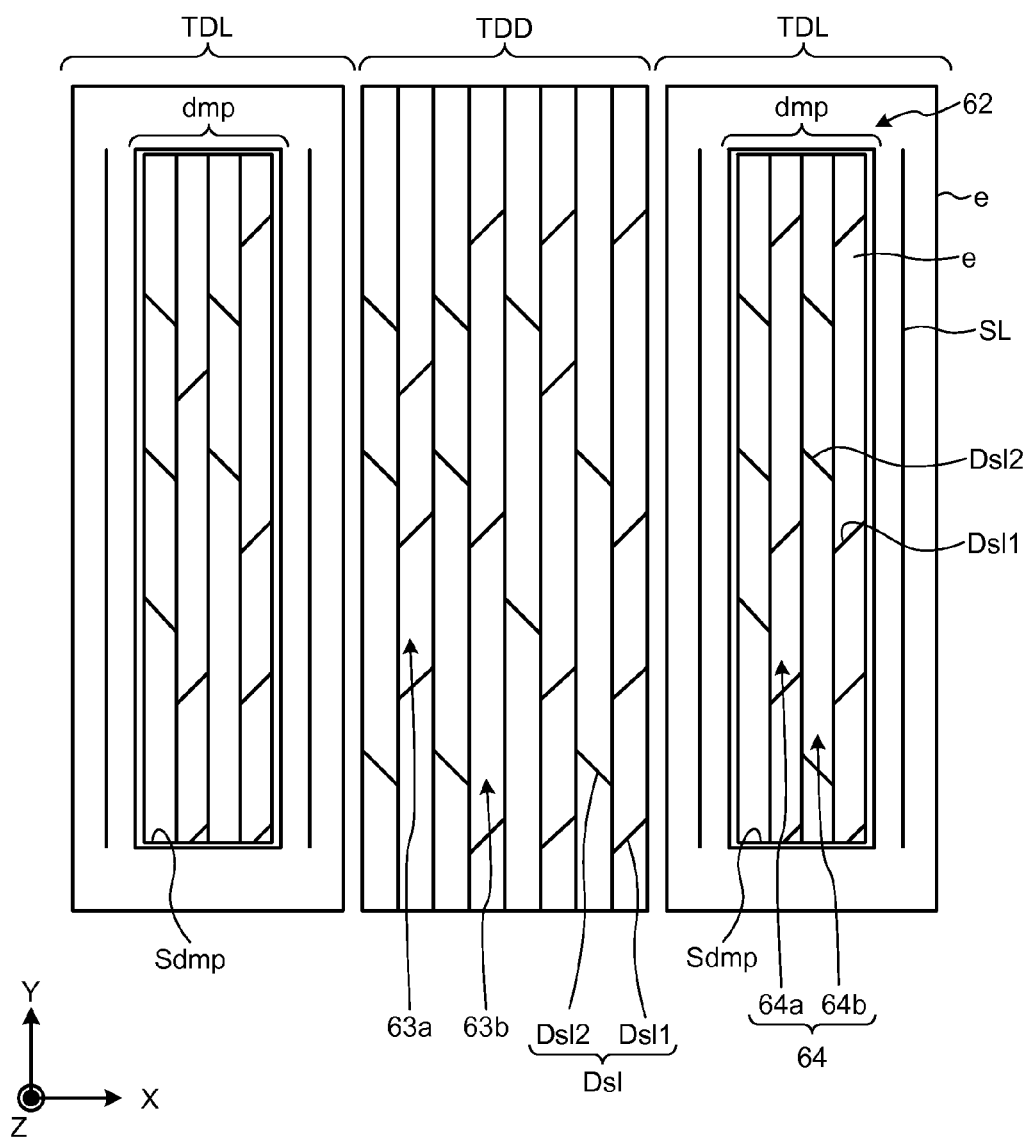
FIG. 14 is a schematic diagram illustrating an arrangement of a dummy electrode according to a first modification of the first embodiment.

FIG. 14 is a schematic diagram illustrating an arrangement of a dummy electrode according to a first modification of the first embodiment. As illustrated in FIG. 14, both ends of the first linear slit Dsl1 are coupled to the adjacent slits SL, respectively. Also, both ends of the second linear slit Dsl2 are coupled to the adjacent slits SL, respectively. The dummy electrode TDD and dummy pattern dmp include a plurality of first linear slits Dsl1, and the first linear slits Dsl1 are arranged at a certain first pitch in the Y-direction. The dummy electrode TDD and dummy pattern dmp include a plurality of second linear slits Dsl2, and the second linear slits Dsl2 are arranged at a certain second pitch in the Y-direction.

The first pitch is an arrangement pitch such that a long space and a short space are alternately repeated. The second pitch is an arrangement pitch such that a long space and a short space are alternately repeated. As a result, the dummy pattern 63 includes a dummy pattern 63a having a small area and a dummy pattern 63b having a large area. Similarly, the dummy pattern 64 includes a dummy pattern 64a having a small area and a dummy pattern 64b having a large area. Because the dummy patterns have different areas, in the display device with a touch detection function 1 according to the first modification of the first embodiment, it is possible to suppress the possibility of difference in the wavelengths of light depending on whether or not there is the translucent conductor e.

When a relation between the long space and the short space of the first pitch is caused to be the same as that of the second pitch, and the position of the first linear slit Dsl1 in the Y-direction is caused to be different from the position of the second linear slit Dsl2 in the Y-direction, the first linear slit Dsl1 and the second linear slit Dsl2 do not align with each other in the X-direction.

As described above, the second direction slits Dsl and the slits SL according to the first modification of the first embodiment are arranged in a such manner that directions thereof vary in three different directions when viewed from a direction orthogonal to the surface of the TFT substrate 21. Accordingly, in the display device with a touch detection function 1, reduction in the transmittance per unit area is averaged for each pixel Pix and the moire fringe can be hardly viewed.

In the display device with a touch detection function 1 according to the first modification of the first embodiment, it is possible to suppress the possibility of difference in the wavelengths of light depending on whether or not there is the translucent conductor e. Accordingly, the display device with a touch detection function 1 according to the first modification of the first embodiment can suppress the possibility that the liquid crystal display unit 20 shifts the color that should be originally displayed. As a result, the display device with a touch detection function 1 according to the first modification of the first embodiment can reduce the possibility that the moire fringe is visually recognized depending on the viewing angle.

1-1D. Second Modification of First Embodiment

Figure 15:
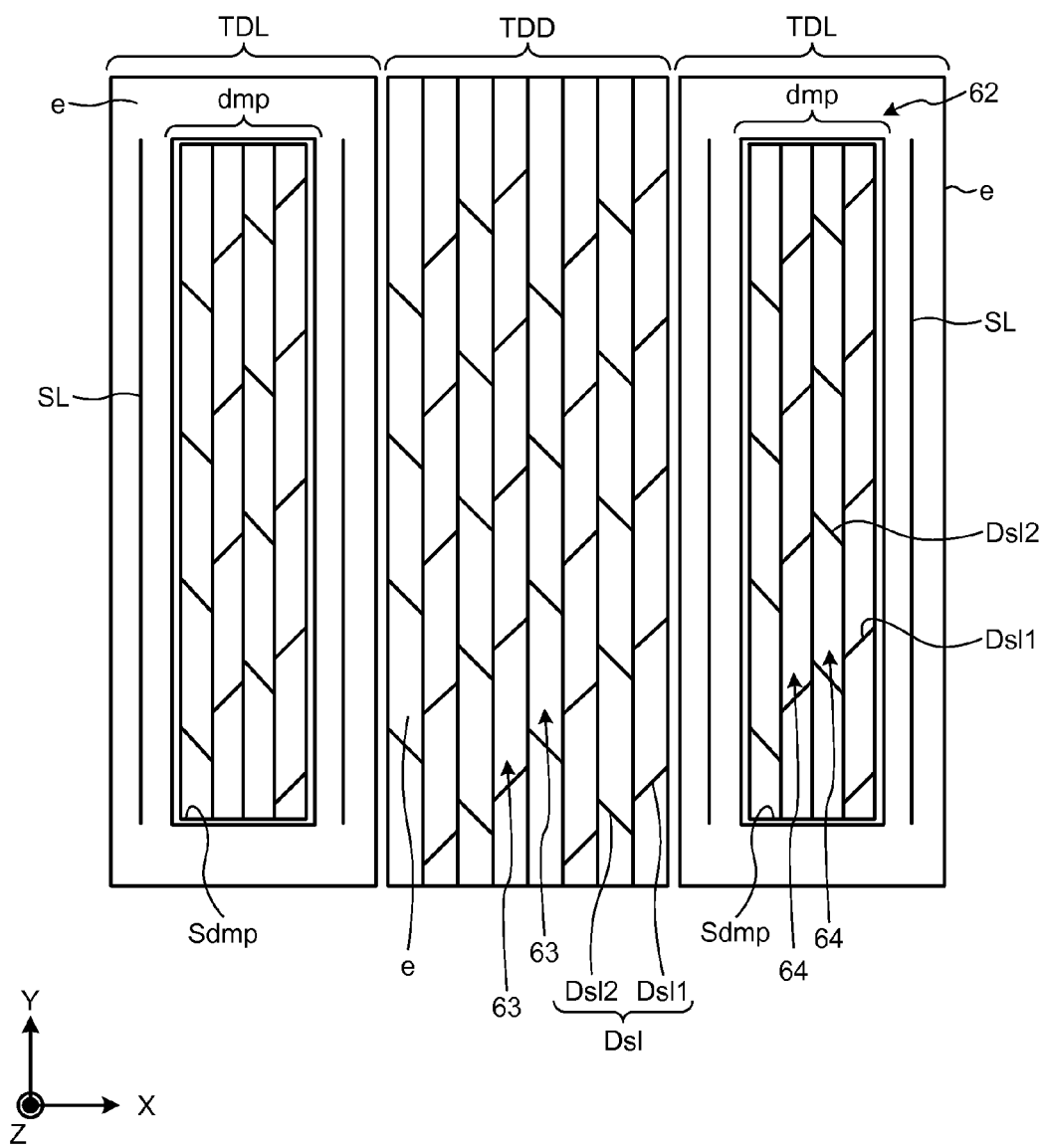
FIG. 15 is a schematic diagram illustrating an arrangement of a dummy electrode according to a second modification of the first embodiment.

FIG. 15 is a schematic diagram illustrating an arrangement of a dummy electrode according to a second modification of the first embodiment. As illustrated in FIG. 15, both ends of the first linear slit Dsl1 are coupled to the adjacent slits SL, respectively. Also, both ends of the second linear slit Dsl2 are coupled to the adjacent slits SL, respectively. The dummy electrode TDD and dummy pattern dmp include a plurality of first linear slits Dsl1, and the first linear slits Dsl1 are arranged at a certain first pitch in the Y-direction. The dummy electrode TDD and dummy pattern dmp include a plurality of second linear slits Dsl2, and the second linear slits Dsl2 are arranged at a certain second pitch in the Y-direction.

The first pitch is caused to be the same as the second pitch and the position of the first linear slit Dsl1 in the Y-direction is caused to be different from the position of the second linear slit Dsl2 in the Y-direction so that the first linear slit Dsl1 and the second linear slit Dsl2 do not align with each other in the X-direction. In the second modification of the first embodiment, the first linear slit Dsl1 and the second linear slit Dsl2 are arranged to be aligned along a direction in which the first linear slit Dsl1 extends. However, the first linear slit Dsl1 and the second linear slit Dsl2 have different angles, that is, the first angle and the second angle, so that the slits SL and the slits Dsl are arranged in a such manner that directions thereof vary in three different directions when viewed from a direction orthogonal to the surface of the TFT substrate 21. Accordingly, in the display device with a touch detection function 1, reduction in the transmittance per unit area is averaged for each pixel Pix and the moire fringe can be hardly viewed.

In the display device with a touch detection function 1 according to the second modification of the first embodiment, it is possible to suppress the possibility of difference in the wavelengths of light depending on whether or not there is the translucent conductor e. Accordingly, the display device with a touch detection function 1 according to the second modification of the first embodiment can suppress the possibility that the liquid crystal display unit 20 shifts the color that should be originally displayed. As a result, the display device with a touch detection function 1 according to the second modification of the first embodiment can reduce the possibility that the moire fringe is visually recognized depending on the viewing angle.

1-1E. Third Modification of First Embodiment

Figure 16:
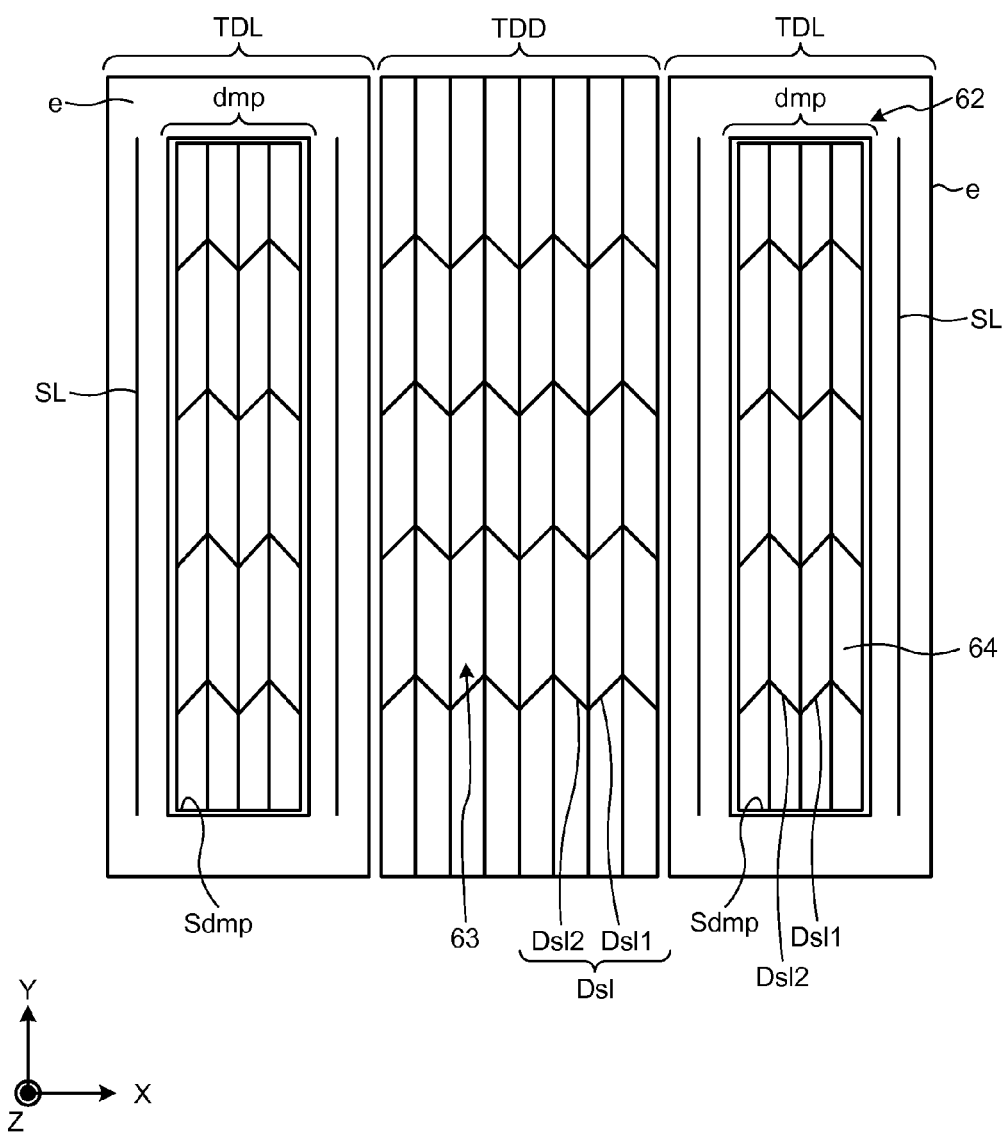
FIG. 16 is a schematic diagram illustrating an arrangement of a dummy electrode according to a third modification of the first embodiment.

FIG. 16 is a schematic diagram illustrating an arrangement of a dummy electrode according to a third modification of the first embodiment. As illustrated in FIG. 16, both ends of the first linear slit Dsl1 are coupled to the adjacent slits SL, respectively. Also, both ends of the second linear slit Dsl2 are coupled to the adjacent slits SL, respectively. The dummy electrode TDD and dummy pattern dmp include a plurality of first linear slits Dsl1, and the first linear slits Dsl1 are arranged at a certain first pitch in the Y-direction. The dummy electrode TDD and dummy pattern dmp include a plurality of second linear slits Dsl2, and the second linear slits Dsl2 are arranged at a certain second pitch in the Y-direction. The end of the first linear slit Dsl1 is coupled to the end of the second linear slit Dsl2. The first linear slit Dsl1 and the second linear slit Dsl2 make a zigzag line or a wavy line extending while being bent at a bending part at which the end of the first linear slit Dsl1 is coupled to the end of the second linear slit Dsl2.

The first pitch is caused to be the same as the second pitch and the first linear slit Dsl1 and the second linear slit Dsl2 align with each other in the X-direction. Accordingly, in the third modification of the first embodiment, the first linear slit Dsl1 and the second linear slit Dsl2 are arranged to be aligned along X-direction direction. However, the first linear slit Dsl1 and the second linear slit Dsl2 have different angles, that is, the first angle and the second angle, so that the slits SL and the slits Dsl are arranged in a such manner that directions thereof vary in three different directions when viewed from a direction orthogonal to the surface of the TFT substrate 21. Accordingly, in the display device with a touch detection function 1, reduction in the transmittance per unit area is averaged for each pixel Pix and the moire fringe can be hardly viewed.

In the display device with a touch detection function 1 according to the third modification of the first embodiment, it is possible to suppress the possibility of difference in the wavelengths of light depending on whether or not there is the translucent conductor e. Accordingly, the display device with a touch detection function 1 according to the third modification of the first embodiment can suppress the possibility that the liquid crystal display unit 20 shifts the color that should be originally displayed. As a result, the display device with a touch detection function 1 according to the third modification of the first embodiment can reduce the possibility that the moire fringe is visually recognized depending on the viewing angle.

1-2. Second Embodiment

Figure 17:
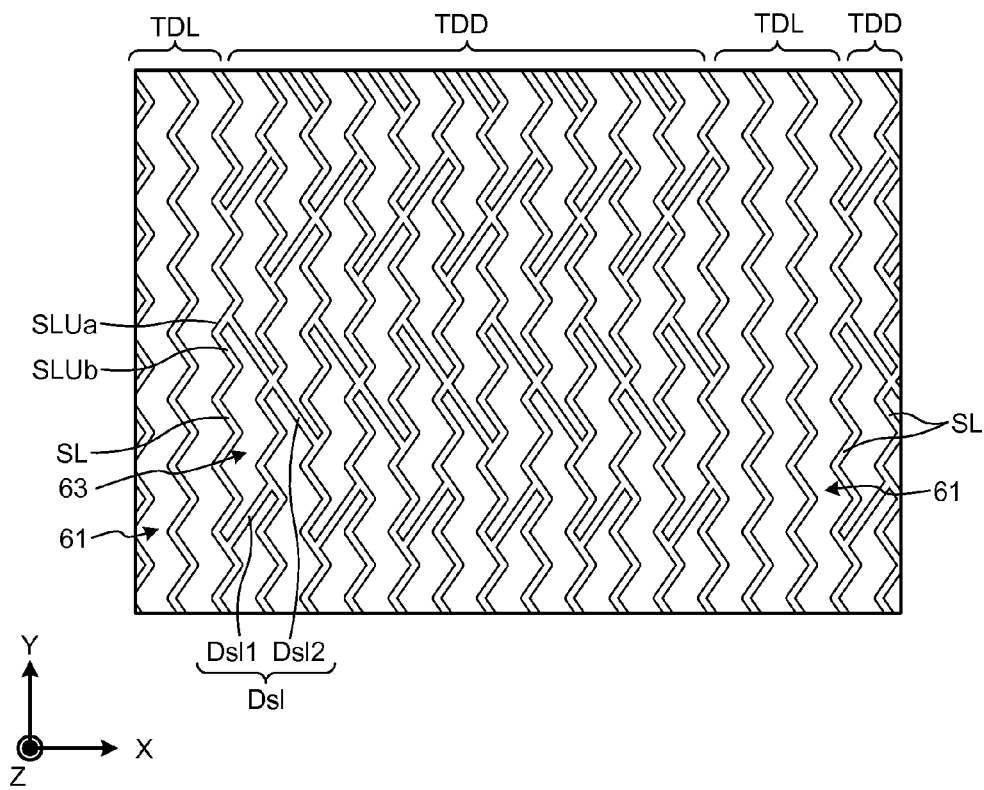
FIG. 17 is a schematic diagram illustrating an arrangement of a dummy electrode according to a second embodiment.

The following describes a display device with a touch detection function 1 according to a second embodiment. FIG. 17 is a schematic diagram illustrating an arrangement of a dummy electrode according to the second embodiment. The same components as those described in the first embodiment will be denoted by the same reference numerals and redundant description will not be repeated.

As illustrated in FIG. 17, both ends of the first linear slit Dsl1 are coupled to the adjacent slits SL, respectively. Also, both ends of the second linear slit Dsl2 are coupled to the adjacent slits SL, respectively. The slit SL according to the second embodiment is the first direction slit that divides touch detection electrode TDL or the dummy electrode TDD, and includes a third linear slit SLUa that is substantially straight and have a third angle with respect to the second direction (X-direction) and a fourth linear slit SLUb that is substantially straight and have a fourth angle different from the third angle with respect to the second direction (X-direction). The slit SL is formed such that the end of the third linear slit SLUa is coupled to the end of the fourth linear slit SLUb to make a bending part. Accordingly, the third linear slit SLUa and the fourth linear slit SLUb make a zigzag line or a wavy line extending in the Y-direction while being bent at the bending part.

The dummy electrode TDD includes the slit SL (first direction slit) that is a region without the translucent conductor e and that divides the translucent conductor into a plurality of the dummy patterns 63 so that the dummy patterns 63 are adjacent to each other in the second direction (X-direction) orthogonal to the first direction (Y-direction), and the second direction slit Dsl that is a region without the translucent conductor e and that divides each of the dummy patterns 63 into a plurality of dummy electrode pieces so that the dummy electrode pieces are adjacent to each other in the first direction (Y-direction). The second direction slits Dsl includes a first linear slit Dsl1 that is substantially straight and has a first angle with respect to the second direction (X-direction), and a second linear slit Dsl2 that is substantially straight and has a second angle different from the first angle with respect to the second direction (X-direction). The first linear slit Dsl1 and the second linear slit Dsl2 are line-symmetric with respect to the X-direction.

The dummy electrode TDD includes a plurality of first linear slits Dsl1, and the first linear slits Dsl1 are arranged at a certain first pitch in the Y-direction. The dummy electrode TDD includes a plurality of second linear slits Dsl2, and the second linear slits Dsl2 are arranged at a certain second pitch in the Y-direction. When the first pitch and the second pitch are caused to have the same size, and a position of the first linear slit Dsl1 in the Y-direction is caused to be different from a position of the second linear slit Dsl2 in the Y-direction, the first linear slit Dsl1 and the second linear slit Dsl2 do not align with each other in the X-direction.

In the dummy electrode TDD according to the second embodiment, the first angle and the third angle are parallel with each other, and the second angle and the fourth angle are parallel with each other. The first linear slit Dsl1 is coupled to a straight line part of the fourth linear slit SLUb. The second linear slit Dsl2 is coupled to a straight line part of the third linear slit SLUa. The first linear slit Dsl1 may intersect the straight line part of the fourth linear slit SLUb to be coupled. The second linear slit Dsl2 may intersect the straight line part of the third linear slit SLUa to be coupled. Accordingly, in the display device with a touch detection function 1 according to the second embodiment the first linear slit Dsl1, the second linear slit Dsl2, the third linear slit SLUa, and the fourth linear slit SLUb average the transmittance to be varied. Accordingly, in the display device with a touch detection function 1 according to the second embodiment, reduction in the transmittance per unit area is averaged for each pixel Pix and the moire fringe can be hardly viewed. Alternatively, the dummy electrode TDD may be configured such that the first angle and the third angle are parallel with each other and the second angle and the fourth angle are not parallel with each other. The dummy electrode TDD may be configured such that the first angle and the third angle are not parallel with each other and the second angle and the fourth angle are parallel with each other.

The touch detection electrode TDL according to the second embodiment is divided by the slits SL of the touch detection electrode including the linear slit having the third angle and the linear slit having the fourth angle. As a result, the display device with a touch detection function 1 according to the second embodiment averages the transmittance to be varied in the touch detection electrode TDL and the dummy electrode TDD. Accordingly, in the display device with a touch detection function 1 according to the second embodiment, reduction in the transmittance per unit area is averaged for each pixel Pix and the moire fringe can be hardly viewed.

1-2A. First Modification of Second Embodiment

Figure 18:
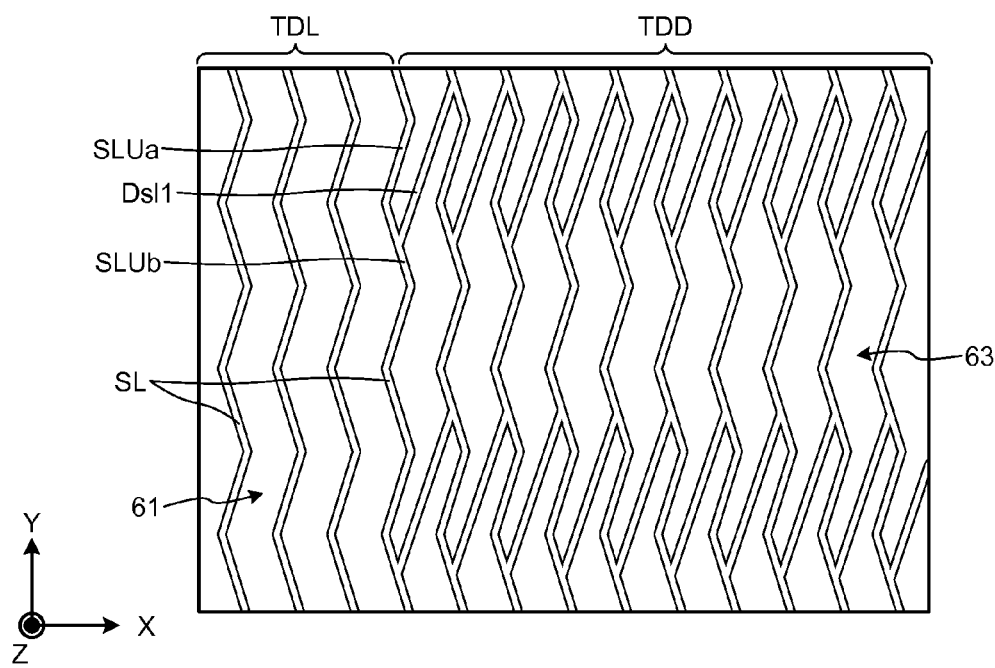
FIG. 18 is a schematic diagram illustrating an arrangement of a dummy electrode according to a first modification of the second embodiment.

FIG. 18 is a schematic diagram illustrating an arrangement of a dummy electrode according to a first modification of the second embodiment. As illustrated in FIG. 18, both ends of the first linear slit Dsl1 are coupled to the adjacent slits SL, respectively. The dummy electrode TDD according to the first modification of the second embodiment utilizes part of the slits SL as the second linear slit. The dummy electrode TDD includes a plurality of first linear slits Dsl1, and the first linear slits Dsl1 are arranged at a certain first pitch in the Y-direction. The end of the first linear slit Dsl1 is coupled to the straight line part of the fourth linear slit SLUb serving as the second linear slit to make a bending part, and the first linear slit Dsl1 and the slit SL make a shape substantially close to a zigzag line or a wavy line extending while being bent at the bending part. Because having the first angle, the third angle, and the fourth angle, the slits SL and the slits Dsl are arranged in such a manner that directions thereof vary in three different directions when viewed from a direction orthogonal to the surface of the TFT substrate 21. Accordingly, in the display device with a touch detection function 1, reduction in the transmittance per unit area is averaged for each pixel Pix and the moire fringe can be hardly viewed.

In the display device with a touch detection function 1 according to the first modification of the second embodiment, it is possible to suppress the possibility of difference in the wavelengths of light depending on whether or not there is the translucent conductor e. Accordingly, the display device with a touch detection function 1 according to the first modification of the second embodiment can suppress the possibility that the liquid crystal display unit 20 shifts the color that should be originally displayed. As a result, the display device with a touch detection function 1 according to the first modification of the second embodiment can reduce the possibility that the moire fringe is visually recognized depending on the viewing angle.

1-2B. Second Modification of Second Embodiment

Figure 19:
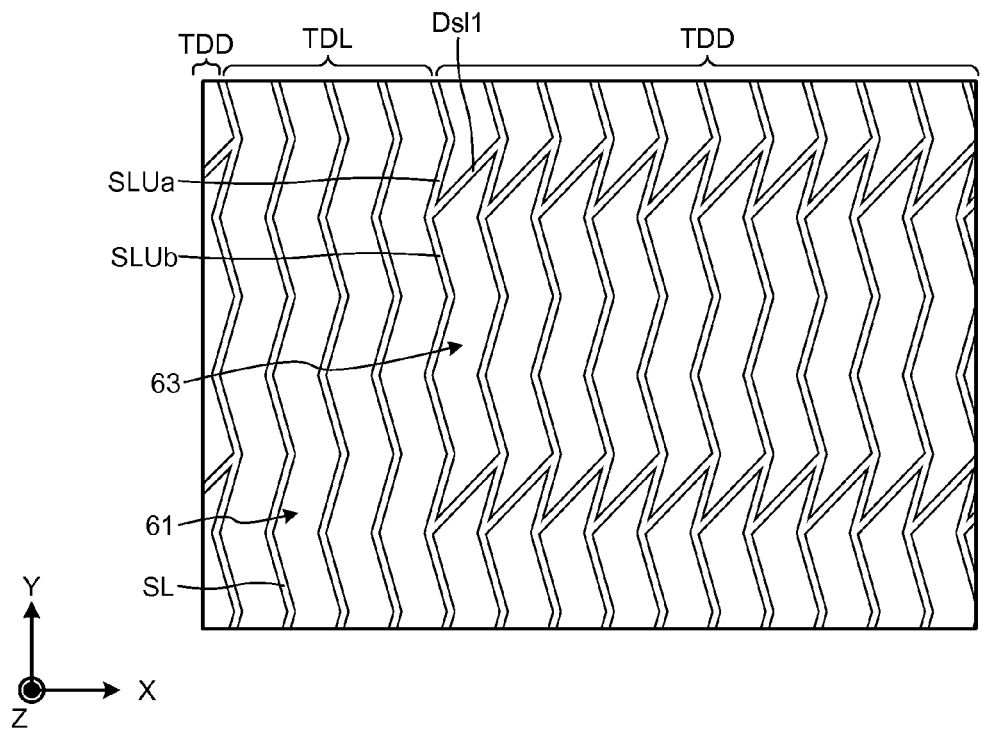
FIG. 19 is a schematic diagram illustrating an arrangement of a dummy electrode according to a second modification of the second embodiment.

FIG. 19 is a schematic diagram illustrating an arrangement of a dummy electrode according to a second modification of the second embodiment. As illustrated in FIG. 19, both ends of the first linear slit Dsl1 are coupled to the adjacent slits SL, respectively. The dummy electrode TDD according to the second modification of the second embodiment utilizes part of the slits SL as the second linear slit. The dummy electrode TDD includes a plurality of first linear slits Dsl1, and the first linear slits Dsl1 are arranged at a certain first pitch in the Y-direction. The end of the first linear slit Dsl1 is coupled to the bending part of the slit SL. Accordingly, the first linear slit Dsl1 and the slit SL make a shape substantially close to a zigzag line or a wavy line extending while being bent at the bending part. Because having the first angle, the third angle, and the fourth angle, the slits SL and the slits Dsl are arranged in such a manner that directions thereof vary in three different directions when viewed from a direction orthogonal to the surface of the TFT substrate 21. Accordingly, in the display device with a touch detection function 1, reduction in the transmittance per unit area is averaged for each pixel Pix and the moire fringe can be hardly viewed.

In the display device with a touch detection function 1 according to the second modification of the second embodiment, it is possible to suppress the possibility of difference in the wavelengths of light depending on whether or not there is the translucent conductor e. Accordingly, the display device with a touch detection function 1 according to the second modification of the second embodiment can suppress the possibility that the liquid crystal display unit 20 shifts the color that should be originally displayed. As a result, the display device with a touch detection function 1 according to the second modification of the second embodiment can reduce the possibility that the moire fringe is visually recognized depending on the viewing angle.

1-3C. Third Modification of Second Embodiment

Figure 20:
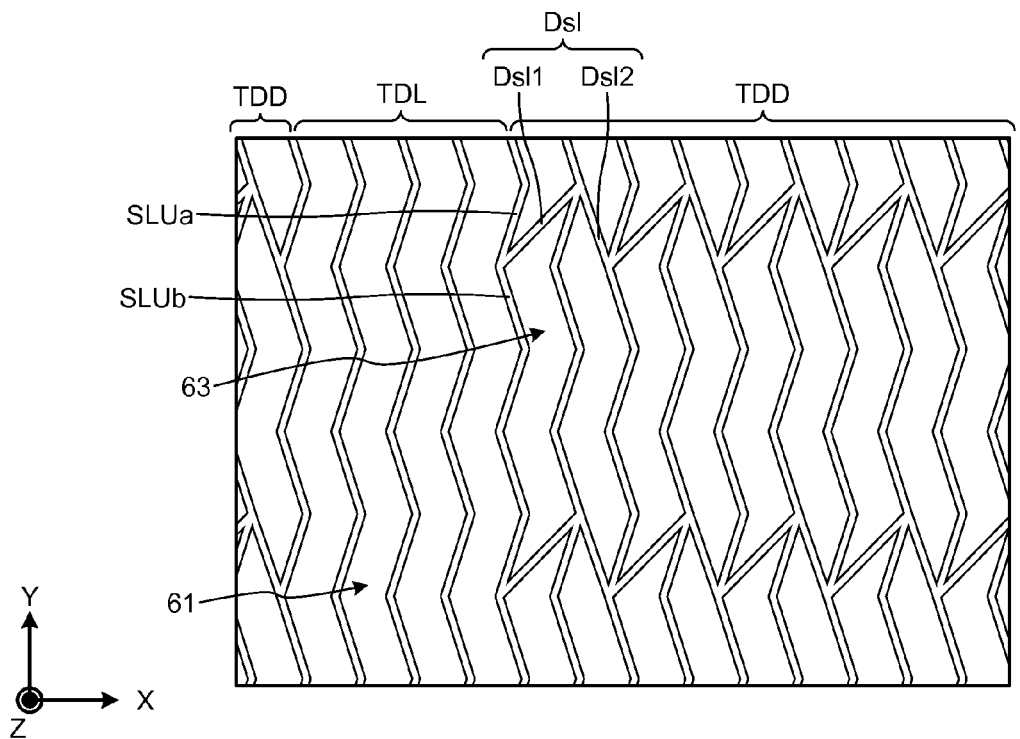
FIG. 20 is a schematic diagram illustrating an arrangement of a dummy electrode according to a third modification of the second embodiment.

FIG. 20 is a schematic diagram illustrating an arrangement of a dummy electrode according to a third modification of the second embodiment. As illustrated in FIG. 20, both ends of the first linear slit Dsl1 are coupled to the bending parts of the adjacent slits SL, respectively. Also, both ends of the second linear slit Dsl2 are coupled to the bending parts of the adjacent slits SL, respectively. The dummy electrode TDD includes a plurality of first linear slits Dsl1, and the first linear slits Dsl1 are arranged at a certain first pitch in the Y-direction. The dummy electrode TDD includes a plurality of second linear slits Dsl2, and the second linear slits Dsl2 are arranged at a certain second pitch in the Y-direction. The end of the first linear slit Dsl1 is coupled to the end of the second linear slit Dsl2. The first linear slit Dsl1 and the second linear slit Dsl2 make a zigzag line or a wavy line extending while being bent at a bending part at which the end of the first linear slit Dsl1 is coupled to the end of the second linear slit Dsl2.

The first pitch is caused to be the same as the second pitch and the first linear slit Dsl1 and the second linear slit Dsl2 align with each other in the X-direction. Accordingly, in the third modification of the second embodiment, the first linear slit Dsl1 and the second linear slit Dsl2 are arranged to be aligned along the X-direction. However, the first linear slit Dsl1 and the second linear slit Dsl2 have different angles, that is, the first angle and the second angle, so that the slits SL and the slits Dsl are arranged in such a manner that directions thereof vary in three different directions when viewed from a direction orthogonal to the surface of the TFT substrate 21. Accordingly, in the display device with a touch detection function 1, reduction in the transmittance per unit area is averaged for each pixel Pix and the moire fringe can be hardly viewed.

In the display device with a touch detection function 1 according to the third modification of the second embodiment, it is possible to suppress the possibility of difference in the wavelengths of light depending on whether or not there is the translucent conductor e. Accordingly, the display device with a touch detection function 1 according to the third modification of the second embodiment can suppress the possibility that the liquid crystal display unit 20 shifts the color that should be originally displayed. As a result, the display device with a touch detection function 1 according to the third modification of the second embodiment can reduce the possibility that the moire fringe is visually recognized depending on the viewing angle.

1-3. Other Modifications

Although some embodiments and modifications have been exemplified hereinabove, the present disclosure is not limited thereto and can be variously modified. The following describes modifications of the first and second embodiments and the modifications thereof. The same components as those described in the first and second embodiments and the modifications thereof will be denoted by the same reference numerals and redundant description will not be repeated.

Figure 21:
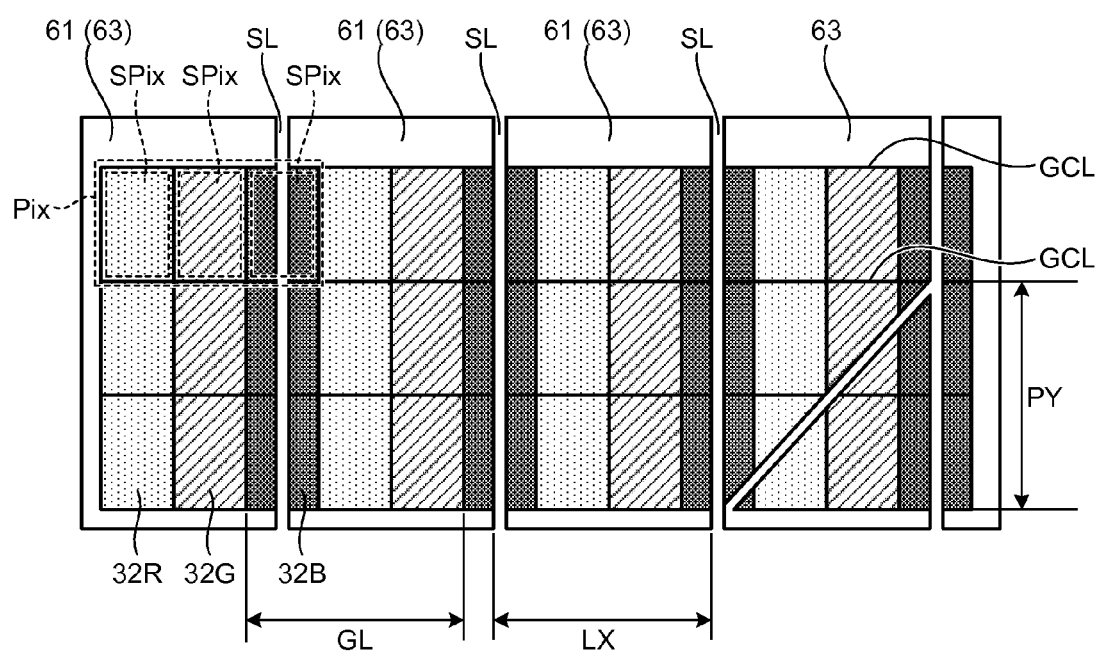
FIG. 21 is a schematic diagram illustrating a specific example of a relation between an arrangement pitch of slits in an X-direction and color regions of a color filter according to another first modification.

FIG. 21 is a schematic diagram illustrating a specific example of a relation between an arrangement pitch of slits in the X-direction and color regions of a color filter according to another first modification. As illustrated in FIG. 21, the color filter 32 includes the color regions 32R, 32G, and 32B colored in red (R), green (G), and blue (B). Generally, the color regions 32R, 32G, and 32B three-dimensionally intersect the direction in which the scanning line GCL extends and extend in a direction orthogonal thereto.

As described above, in the color filter 32, the color regions 32R, 32G, and 32B colored in red (R), green (G), and blue (B) are associated with respective sub-pixels SPix, and also associated with the pixel Pix as a set. Assuming that a pitch of the pixel Pix (a pitch of a set of sub-pixels SPix) in the extending direction of the scanning line GCL is a pixel pitch GL and a pitch of the slit SL in the extending direction (X-direction) of the scanning line GCL described above is a slit pitch LX, the slit pitch LX is a multiplication by a natural number of the pixel pitch GL. Assuming that a pitch of the slit Dsl1 in a direction (Y-direction) orthogonal to the extending direction of the scanning line GCL is a slit pitch PY, the slit pitch PY is a multiplication by a natural number of the pixel pitch GL. For example, the slit pitch PY is preferably 150 μm or less.

In this way, the slits SL in the detection electrode pattern 61 of the touch detection electrode TDL are arranged at an interval of a multiplication by a natural number (for example, 1) of the pitch of the pixels Pix of the pixel electrodes 22 arranged in a matrix. Similarly, the slits SL in the dummy patterns 63 and 64 are arranged at an interval of a multiplication by a natural number (for example, 1) of the pitch of the pixels Pix of the pixel electrodes 22 arranged in a matrix.

A wavelength of light that reaches a person passing through the detection electrode pattern 61, the detection electrode conducting part 62, or the dummy pattern 64 of the touch detection electrode TDL or the dummy pattern 63 of the dummy electrode TDD from the pixel Pix of the liquid crystal display unit 20 may be different from a wavelength of light that reaches a person passing through the slit SL from the pixel Pix of the liquid crystal display unit 20 depending on whether or not there is the translucent conductor e. The difference in the wavelengths of light may emerge as a change from color that should be originally displayed, and a moire fringe may be visually recognized depending on a viewing angle at which the person views the display unit with a touch detection function 10.

As described above, the slits SL according to another first modification are arranged at an interval of a multiplication by a natural number (for example, 1, 2, 3, etc.) of the pitch of the pixels Pix of the pixel electrodes 22 arranged in a matrix. Accordingly, the slit SL according to another first modification overlaps with the color regions of specific color when viewed from a direction orthogonal to the surface of the TFT substrate 21. For example, as illustrated in FIG. 21, the slit SL overlaps with the color regions 32B when viewed from a direction orthogonal to the surface of the TFT substrate 21. Accordingly, in the display device with a touch detection function 1 according to another first modification, the slit SL does not generate variation in reduction of the transmittance for each pixel Pix.

In the display device with a touch detection function 1 according to another first modification, influence by the slit SL can be reduced as compared to a case in which there is the slit SL for each sub-pixel SPix. As a result, in the display device with a touch detection function 1 according to another first modification, it is possible to suppress the possibility of difference in the wavelengths of light depending on whether or not there is the translucent conductor e. Accordingly, the display device with a touch detection function 1 according to another first modification can suppress the possibility that the liquid crystal display unit 20 shifts the color that should be originally displayed. As a result, the display device with a touch detection function 1 according to another first modification can reduce the possibility that the moire fringe is visually recognized depending on the viewing angle.

In the above embodiments, as described in the first embodiment, the drive electrode COML is driven one by one. However, the embodiment is not limited thereto. Alternatively, for example, the predetermined number of drive electrodes COML may be driven to perform scanning while shifting the drive electrodes COML one by one.

Figure 22:
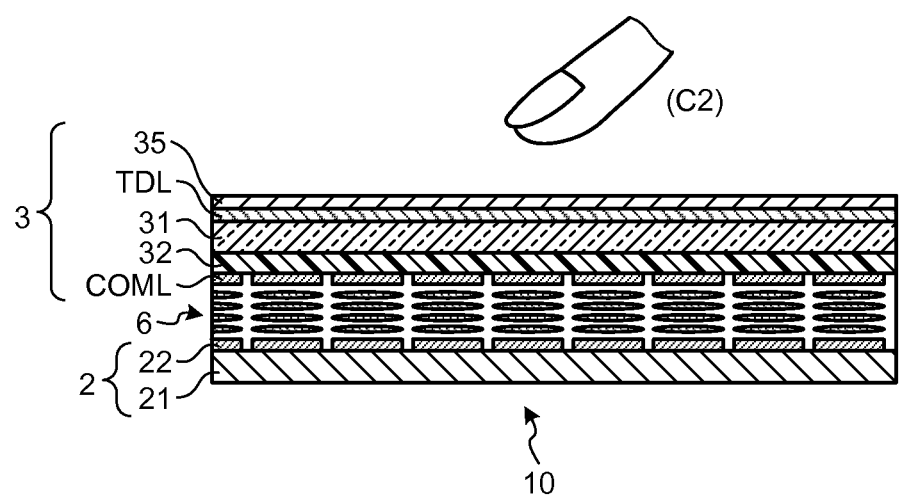
FIG. 22 is a cross-sectional view illustrating a schematic cross-sectional structure of a display unit with a touch detection function according to another second modification.

FIG. 22 is a cross-sectional view illustrating a schematic cross-sectional structure of a display unit with a touch detection function according to another second modification. In the display device with a touch detection function 1 according each of to the embodiments, the liquid crystal display unit 20 containing liquid crystals in a horizontal electric field mode such as an FFS mode and an IPS mode can be integrated with the touch detection device 30 to make the display unit with a touch detection function 10. Instead of such configuration, as the display unit with a touch detection function 10 according to another second modification illustrated in FIG. 22, the touch detection device may be integrated with liquid crystals in a vertical electric field mode such as a twisted nematic (TN) mode, a vertical alignment (VA) mode, and an electrically controlled birefringence (ECB) mode.

2. Application Examples

With reference to FIG. 23 to FIG. 35, the following describes application examples of the display devices with a touch detection function 1 described in the embodiments and the modifications thereof. FIG. 23 to FIG. 35 are diagrams illustrating examples of an electronic apparatus to which the display device with a touch detection function according to any one of the embodiments and the modifications thereof is applied. The display device with a touch detection function 1 according to any one of the embodiments and the modifications thereof can be applied to electronic apparatuses in various fields such as television apparatuses, digital cameras, notebook-type personal computers, portable information devices such as cellular telephones, and video cameras. In other words, the display device with a touch detection function 1 according to the embodiment and the modifications thereof can be applied to the electronic apparatuses in various fields that display a video signal input from the outside or a video signal generated inside as an image or a video.

Application Example 1

Figure 23:
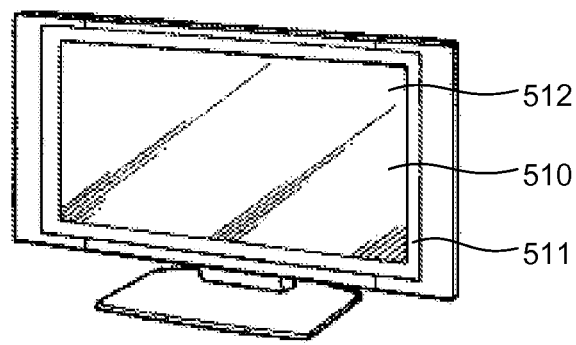
FIG. 23 is a diagram illustrating an example of an electronic apparatus to which the display device with a touch detection function according to any one of the embodiments and the modifications thereof is applied.

An electronic apparatus illustrated in FIG. 23 is a television apparatus to which the display device with a touch detection function 1 according to any one of the embodiments and the modifications thereof is applied. For example, the television apparatus includes a video display screen unit 510 including a front panel 511 and a filter glass 512, and the video display screen unit 510 is the display device with a touch detection function according to any one of the embodiments and the modifications thereof.

Application Example 2

Figure 24:
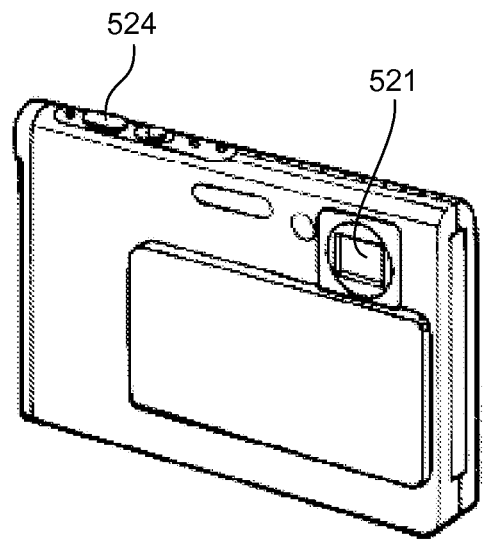
FIG. 24 is a diagram illustrating an example of an electronic apparatus to which the display device with a touch detection function according to any one of the embodiments and the modifications thereof is applied.
Figure 25:
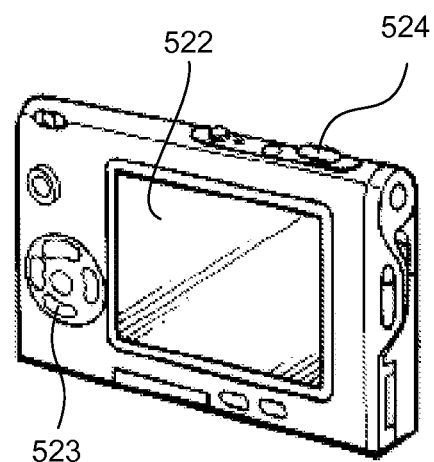
FIG. 25 is a diagram illustrating an example of an electronic apparatus to which the display device with a touch detection function according to any one of the embodiments and the modifications thereof is applied.

An electronic apparatus illustrated in FIG. 24 and FIG. 25 is a digital camera to which the display device with a touch detection function 1 according to any one of the embodiments and the modifications thereof is applied. For example, the digital camera includes a flash light emitting unit 521, a display unit 522, a menu switch 523, and a shutter button 524.

The display unit 522 is the display device with a touch detection function according to any one of the embodiments and the modifications thereof.

Application Example 3

Figure 26:
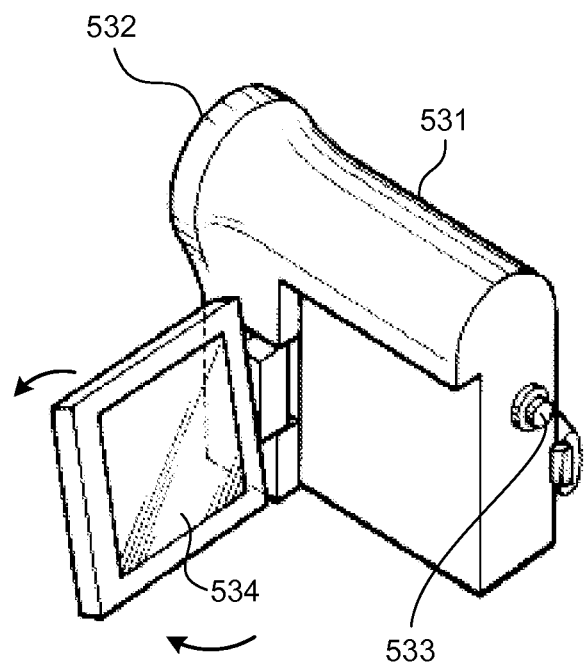
FIG. 26 is a diagram illustrating an example of an electronic apparatus to which the display device with a touch detection function according to any one of the embodiments and the modifications thereof is applied.

An electronic apparatus illustrated in FIG. 26 represents an external appearance of a video camera to which the display device with a touch detection function 1 according to any one of the embodiments and the modifications thereof is applied. For example, the video camera includes a main body part 531, a lens 532 for photographing a subject provided at a front side of the main body part 531, a start/stop switch 533 for photography, and a display unit 534. The display unit 534 is the display device with a touch detection function according to any one of the embodiments and the modifications thereof.

Application Example 4

Figure 27:
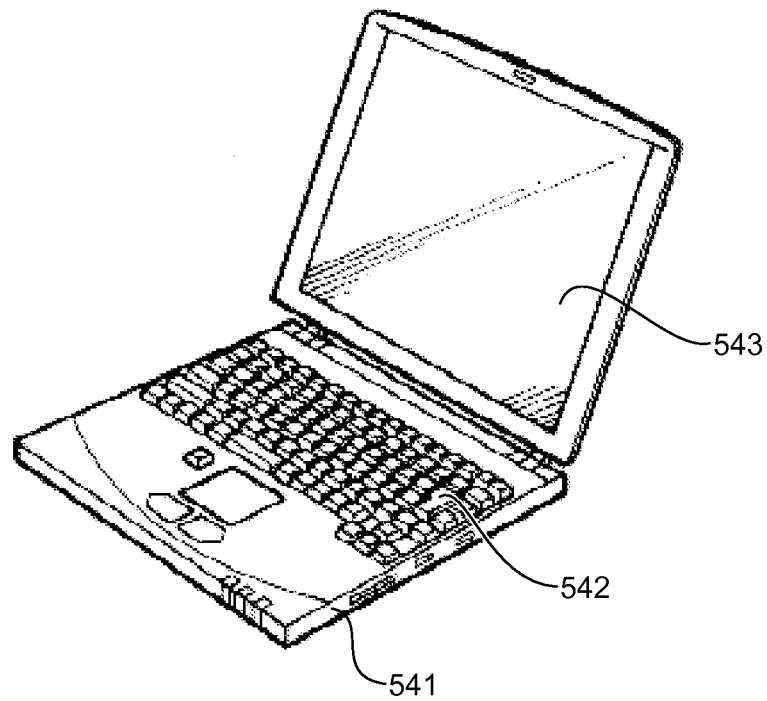
FIG. 27 is a diagram illustrating an example of an electronic apparatus to which the display device with a touch detection function according to any one of the embodiments and the modifications thereof is applied.
Figure 28:
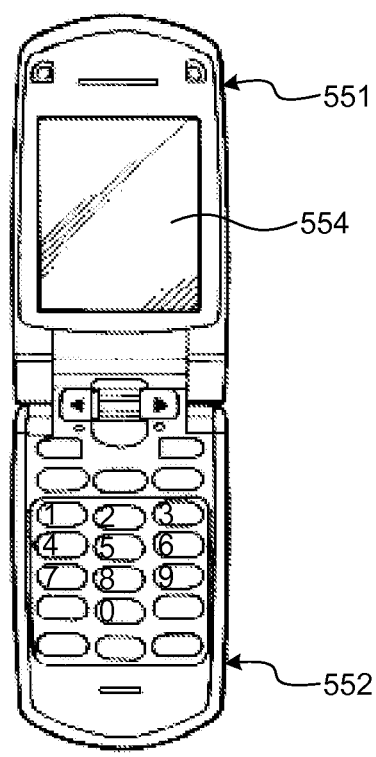
FIG. 28 is a diagram illustrating an example of an electronic apparatus to which the display device with a touch detection function according to any one of the embodiments and the modifications thereof is applied.
Figure 29:
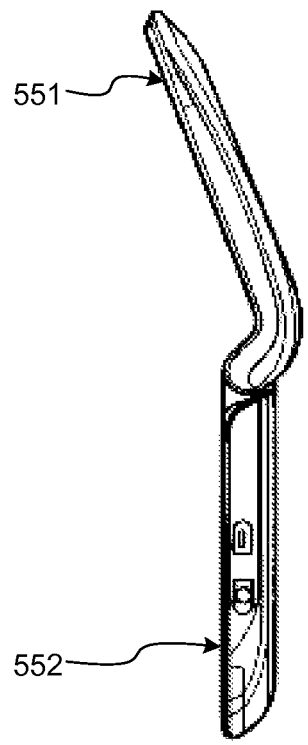
FIG. 29 is a diagram illustrating an example of an electronic apparatus to which the display device with a touch detection function according to any one of the embodiments and the modifications thereof is applied.
Figure 30:
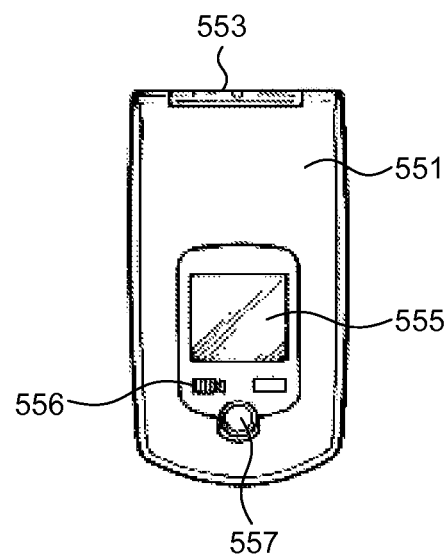
FIG. 30 is a diagram illustrating an example of an electronic apparatus to which the display device with a touch detection function according to any one of the embodiments and the modifications thereof is applied.
Figure 31:
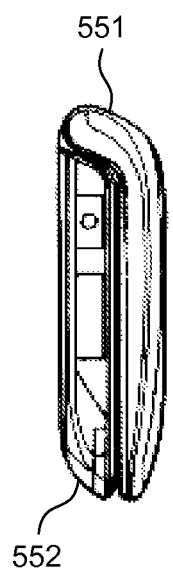
FIG. 31 is a diagram illustrating an example of an electronic apparatus to which the display device with a touch detection function according to any one of the embodiments and the modifications thereof is applied.
Figure 32:
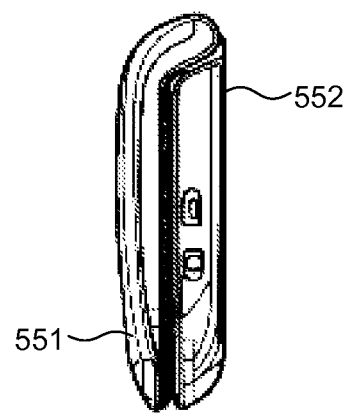
FIG. 32 is a diagram illustrating an example of an electronic apparatus to which the display device with a touch detection function according to any one of the embodiments and the modifications thereof is applied.
Figure 33:
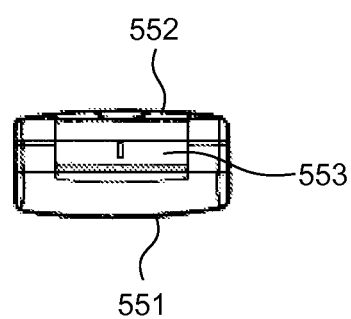
FIG. 33 is a diagram illustrating an example of an electronic apparatus to which the display device with a touch detection function according to any one of the embodiments and the modifications thereof is applied.
Figure 34:
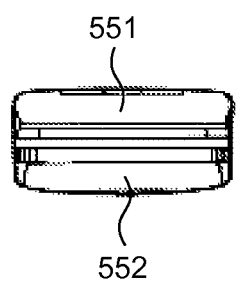
FIG. 34 is a diagram illustrating an example of an electronic apparatus to which the display device with a touch detection function according to any one of the embodiments and the modifications thereof is applied.

An electronic apparatus illustrated in FIG. 27 is a notebook-type personal computer to which the display device with a touch detection function 1 according to any one of the embodiments and the modifications thereof is applied. For example, the notebook-type personal computer includes a main body 541, a keyboard 542 for input operation of characters and the like, and a display unit 543 that displays an image. The display unit 543 is the display device with a touch detection function according to any one of the embodiments and the modifications thereof.

Application Example 5

An electronic apparatus illustrated in FIG. 28 to FIG. 34 is a mobile phone to which the display device with a touch detection function 1 according to any one of the embodiments and the modifications thereof is applied. For example, the mobile phone is made by connecting an upper housing 551 and a lower housing 552 with a connecting part (hinge part) 553, and includes a display device 554, a sub-display device 555, a picture light 556, and a camera 557. Each of the display device 554 and the sub-display device 555 is the display device with a touch detection function according to any one of the embodiments and the modifications thereof.

Application Example 6

Figure 35:
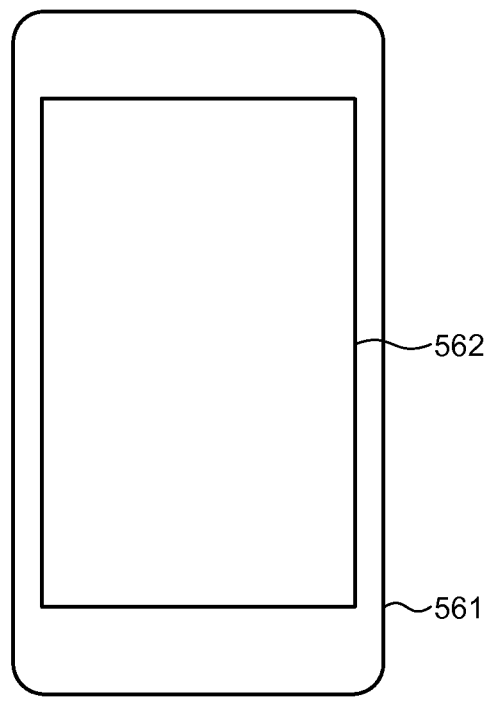
FIG. 35 is a diagram illustrating an example of an electronic apparatus to which the display device with a touch detection function according to any one of the embodiments and the modifications thereof is applied.

An electronic apparatus illustrated in FIG. 35 is a portable information terminal that operates as a mobile computer, a multifunctional mobile phone, a mobile computer allowing voice communication, or a mobile computer allowing communication, and may be called a smart phone or a tablet terminal in some cases. For example, the portable information terminal includes a display unit 562 on a surface of a housing 561. The display unit 562 is the display device with a touch detection function 1 according to any one of the embodiments and the modifications thereof.

3. Aspects of Present Disclosure

The present disclosure includes aspects as follows.
(1) A display device with a touch detection function comprising:
a substrate;
a display region in which pixels each including a plurality of color regions are arranged in a matrix in a plane parallel to a surface of the substrate;
a touch detection electrode of a translucent conductor extending in a first direction in a plane parallel to the surface of the substrate;
a dummy electrode of the translucent conductor provided in a region where the touch detection electrode is not provided when viewed from a direction orthogonal to the surface of the substrate;
a drive electrode having capacitance with respect to the touch detection electrode; and
a display functional layer for displaying an image in the display region, wherein
the dummy electrode comprises:
a first direction slit that is a region without the translucent conductor, the first direction slit dividing the dummy electrode so that pieces of the dummy electrode are adjacent to each other in a second direction orthogonal to the first direction; and
a plurality of second direction slits each of which is a region without the translucent conductor, each second direction slit dividing the dummy so that the pieces of the dummy electrode are adjacent to each other in the first direction, and
the second direction slits include a first linear slit that is substantially straight and has a first angle with respect to the second direction and a second linear slit that is substantially straight and has a second angle different from the first angle with respect to the second direction.
(2) The display device with a touch detection function according to (1), wherein
the first direction slit comprises:
a third linear slit that is substantially straight and has a third angle with respect to the second direction; and
a fourth linear slit that is substantially straight and has a fourth angle different from the third angle with respect to the second direction, and
an end of the third linear slit is coupled to an end of the fourth linear slit to be a bending part.
(3) The display device with a touch detection function according to (2), wherein the touch detection electrode is divided by slits of the touch detection electrode including a linear slit having the third angle and a linear slit having the fourth angle.
(4) The display device with a touch detection function according to (2), wherein the first angle is parallel to the third angle.
(5) The display device with a touch detection function according to (2), wherein the second angle is parallel to the fourth angle.
(6) The display device with a touch detection function according to (1), wherein the first linear slit is provided in plurality and the first linear slits are arranged at a certain first pitch.
(7) The display device with a touch detection function according to (1), wherein the second linear slit is provided in plurality and the second linear slits are arranged at a certain second pitch.
(8) The display device with a touch detection function according to (1), wherein the first linear slit is coupled to a straight line part of the fourth linear slit.
(9) The display device with a touch detection function according to (1), wherein the first linear slit is coupled to an end of the fourth linear slit.
(10) The display device with a touch detection function according to (1), wherein the dummy electrode include the second direction slit of a different number of the number of the first direction slit.

(11) The display device with a touch detection function according to (1), wherein an end of the first linear slit is coupled to an end of the second linear slit.

(12) The display device with a touch detection function according to (1), wherein an end of the first linear slit is coupled to an end of the second linear slit to make a zigzag line or a wavy line.

(13) The display device with a touch detection function according to (1), wherein
the first direction slit of the dummy electrode is provided in plurality at a certain slit pitch in the second direction, and
the slit pitch is a multiplication by a natural number of a pixel pitch at which the pixels are arranged.

(14) An electronic apparatus having a display device with a touch detection function configured to detect an object approaching from outside, the display device with a touch detection function comprising:
a substrate;
a display region in which pixels each including a plurality of color regions are arranged in a matrix in a plane parallel to a surface of the substrate;
a touch detection electrode of a translucent conductor extending in a first direction in a plane parallel to the surface of the substrate;
a dummy electrode of the translucent conductor provided in a region where the touch detection electrode is not provided when viewed from a direction orthogonal to the surface of the substrate;
a drive electrode having capacitance with respect to the touch detection electrode; and
a display functional layer for displaying an image in the display region, wherein
the dummy electrode comprises:
a first direction slit that is a region without the translucent conductor, the first direction slit dividing the dummy electrode so that pieces of the dummy electrode are adjacent to each other in a second direction orthogonal to the first direction; and
a plurality of second direction slits each of which is a region without the translucent conductor, each second direction slit dividing the dummy so that the pieces of the dummy electrode are adjacent to each other in the first direction, and
the second direction slits include a first linear slit that is substantially straight and has a first angle with respect to the second direction and a second linear slit that is substantially straight and has a second angle different from the first angle with respect to the second direction.

(15) The electronic apparatus according to (14), wherein an end of the first linear slit is coupled to an end of the second linear slit to make a zigzag line or a wavy line.

The electronic apparatus according to the present disclosure includes the display device with a touch detection function. Examples thereof include, but are not limited to, a television apparatus, a digital camera, a personal computer, a video camera, a portable terminal device such as a cellular telephone, or the like.

The display device with a touch detection function and the electronic apparatus according to the present disclosure suppress possibility of causing a difference between the wavelengths of light depending on whether or not there is a translucent conductor. Accordingly, the display device with a touch detection function can suppress possibility of shifting color to be originally displayed.

With the display device with a touch detection function and the electronic apparatus of the present disclosure, it is possible to reduce the possibility that the moire fringe is visually recognized depending on the viewing angle.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function comprising:
a substrate;
a display region in which pixels each including a plurality of color regions are arranged in a matrix in a plane parallel to a surface of the substrate;
a touch detection electrode of a translucent conductor extending in a first direction in the plane parallel to the surface of the substrate;
a dummy electrode of the translucent conductor provided in a region where the touch detection electrode is not provided when viewed from a direction orthogonal to the surface of the substrate, wherein the dummy electrode is disposed on the plane that the touch detection electrode is provided;
a drive electrode having capacitance with respect to the touch detection electrode; and
a display functional layer for displaying an image in the display region, wherein
the dummy electrode comprises:
a first direction slit that is a region without the translucent conductor, the first direction slit dividing the dummy electrode so that pieces of the dummy electrode are adjacent to each other in a second direction orthogonal to the first direction; and
a plurality of second direction slits each of which is a region without the translucent conductor, each second direction slit dividing the dummy so that the pieces of the dummy electrode are adjacent to each other in the first direction,
wherein the second direction slits include a first linear slit that is substantially straight and has a first angle with respect to the second direction and a second linear slit that is substantially straight and has a second angle different from the first angle with respect to the second direction, and the first linear slit is not parallel to the second linear slit.

2. A display device with a touch detection function, comprising:
a substrate;
a display region in which pixels each including a plurality of color regions are arranged in a matrix in a plane parallel to a surface of the substrate;
a touch detection electrode of a translucent conductor extending in a first direction in the plane parallel to the surface of the substrate;
a dummy electrode of the translucent conductor provided in a region where the touch detection electrode is not provided when viewed from a direction orthogonal to the surface of the substrate, wherein the dummy electrode is disposed on the plane that the touch detection electrode is provided;
a drive electrode having capacitance with respect to the touch detection electrode; and
a display functional layer for displaying an image in the display region, wherein
wherein the dummy electrode comprises:
a first direction slit that is a region without the translucent conductor, the first direction slit dividing the dummy electrode so that pieces of the dummy electrode are adjacent to each other in a second direction orthogonal to the first direction; and a plurality of second direction slits each of which is a region without the translucent conductor, each second direction slit dividing the dummy so that the pieces of the dummy electrode are adjacent to each other in the first direction, wherein the second direction slits include a first linear slit that is substantially straight and has a first angle with respect to the second direction and a second linear slit that is substantially straight and has a second angle different from the first angle with respect to the second direction, wherein the first direction slit comprises:

a third linear slit that is substantially straight and has a third angle with respect to the second direction; and a fourth linear slit that is substantially straight and has a fourth angle different from the third angle with respect to the second direction, wherein an end of the third linear slit is coupled to an end of the fourth linear slit to be a bending part, and wherein the first direction slit includes at least one of a zigzag line and a wavy line.

3. The display device with a touch detection function according to claim 2, wherein the touch detection electrode is divided by slits of the touch detection electrode including a linear slit having the third angle and a linear slit having the fourth angle.

4. The display device with a touch detection function according to claim 2, wherein the first angle is parallel to the third angle.

5. The display device with a touch detection function according to claim 2, wherein the second angle is parallel to the fourth angle.

6. The display device with a touch detection function according to claim 1, wherein the first linear slit is provided in plurality and the first linear slits are arranged at a certain first pitch.

7. The display device with a touch detection function according to claim 1, wherein the second linear slit is provided in plurality and the second linear slits are arranged at a certain second pitch.

8. The display device with a touch detection function according to claim 2, wherein the first linear slit is coupled to a straight line part of the fourth linear slit.

9. The display device with a touch detection function according to claim 2, wherein the first linear slit is coupled to an end of the fourth linear slit.

10. The display device with a touch detection function according to claim 1, wherein the dummy electrode include the second direction slit of a different number of the number of the first direction slit.

11. The display device with a touch detection function according to claim 1, wherein an end of the first linear slit is coupled to an end of the second linear slit.

12. The display device with a touch detection function according to claim 1, wherein an end of the first linear slit is coupled to an end of the second linear slit to make at least one of a zigzag line and a wavy line.

13. The display device with a touch detection function according to claim 1, wherein the first direction slit of the dummy electrode is provided in plurality at a certain slit pitch in the second direction, and the slit pitch is a multiplication by a natural number of a pixel pitch at which the pixels are arranged.

14. An electronic apparatus having a display device with a touch detection function configured to detect an object approaching from outside, the display device with a touch detection function comprising:

a substrate;

a display region in which pixels each including a plurality of color regions are arranged in a matrix in a plane parallel to a surface of the substrate;

a touch detection electrode of a translucent conductor extending in a first direction in a plane parallel to the surface of the substrate;

a dummy electrode of the translucent conductor provided in a region where the touch detection electrode is not provided when viewed from a direction orthogonal to the surface of the substrate, wherein the dummy electrode is disposed on the plane that the touch detection electrode is provided;

a drive electrode having capacitance with respect to the touch detection electrode; and a display functional layer for displaying an image in the display region, wherein the dummy electrode comprises:

a first direction slit that is a region without the translucent conductor, the first direction slit dividing the dummy electrode so that pieces of the dummy electrode are adjacent to each other in a second direction orthogonal to the first direction; and a plurality of second direction slits each of which is a region without the translucent conductor, each second direction slit dividing the dummy so that the pieces of the dummy electrode are adjacent to each other in the first direction, wherein the second direction slits include a first linear slit that is substantially straight and has a first angle with respect to the second direction and a second linear slit that is substantially straight and has a second angle different from the first angle with respect to the second direction, and the first linear slit is not parallel to the second linear slit.

15. The electronic apparatus according to claim 14, wherein an end of the first linear slit is coupled to an end of the second linear slit to make at least one of a zigzag line and a wavy line.

16. The electronic apparatus according to claim 14, wherein the electronic apparatus includes at least one of a digital camera, a video camera, a notebook-type personal computer, a mobile phone and a portable information terminal.

17. The display device with a touch detection function according to claim 1, wherein the touch detection electrode includes a detection electrode pattern, a detection electrode conducting part and a dummy pattern, and wherein the dummy pattern is insulated from the detection electrode pattern and the detection electrode conducting part.

18. The display device with a touch detection function according to claim 1, wherein the dummy electrode further comprises a first dummy electrode including at least two first linear slits and a second dummy electrode including at least two second linear slits.

19. The electronic apparatus according to claim 14, wherein the dummy electrode further comprises a first dummy electrode including at least two first linear slits and a second dummy electrode including at least two second linear slits.

* * * * *